(12) United States Patent
Katayama et al.

(10) Patent No.: US 7,395,498 B2
(45) Date of Patent: Jul. 1, 2008

(54) APPARATUS AND METHOD FOR EVALUATING WEB PAGES

(75) Inventors: Yoshinori Katayama, Kawasaki (JP);
Junko Furukawa, Kawasaki (JP);
Fumihito Nishino, Beijing (CN)

(73) Assignee: Fujitsu Limited, Kawasaki (JP)

( * ) Notice: Subject to any disclaimer, the term of this patent is extended or adjusted under 35 U.S.C. 154(b) by 492 days.

(21) Appl. No.: 10/327,027

(22) Filed: Dec. 24, 2002

(65) Prior Publication Data

US 2003/0172349 A1 Sep. 11, 2003

(30) Foreign Application Priority Data

Mar. 6, 2002 (JP) ............ 2002-060507
Oct. 29, 2002 (JP) ............ 2002-313711

(51) Int. Cl.
*G06N 3/00* (2006.01)
(52) U.S. Cl. ............... 715/234; 707/E17.108
(58) Field of Classification Search ........ 715/513, 715/903, 234, 200; 707/102, 1, E17.108; 705/1
See application file for complete search history.

(56) References Cited

U.S. PATENT DOCUMENTS

| | | | |
|---|---|---|---|
| 5,991,756 A * | 11/1999 | Wu ............... | 707/3 |
| 6,260,064 B1 * | 7/2001 | Kurzrok ........... | 709/224 |
| 6,647,381 B1 * | 11/2003 | Li et al. ............ | 707/3 |
| 6,751,612 B1 * | 6/2004 | Schuetze et al. ..... | 707/4 |
| 6,785,671 B1 * | 8/2004 | Bailey et al. ........ | 707/3 |
| 6,816,857 B1 * | 11/2004 | Weissman et al. .... | 707/5 |
| 6,918,066 B2 * | 7/2005 | Dutta et al. ........ | 714/46 |
| 6,983,320 B1 * | 1/2006 | Thomas et al. ..... | 709/224 |
| 6,990,628 B1 * | 1/2006 | Palmer et al. ...... | 715/234 |
| 2002/0040311 A1 * | 4/2002 | Douglass et al. ..... | 705/7 |
| 2002/0083129 A1 * | 6/2002 | Yamade et al. ...... | 709/203 |
| 2002/0089532 A1 * | 7/2002 | Cohen et al. ........ | 345/736 |
| 2002/0122078 A1 * | 9/2002 | Markowski ......... | 345/853 |
| 2004/0024752 A1 * | 2/2004 | Manber et al. ...... | 707/3 |
| 2006/0036598 A1 * | 2/2006 | Wu ................. | 707/5 |

FOREIGN PATENT DOCUMENTS

| | | |
|---|---|---|
| GB | 2368670 | 5/2002 |
| GB | 2384598 | 7/2003 |
| JP | H11-259524 | 9/1999 |
| JP | 2001-243147 | 9/2001 |

(Continued)

OTHER PUBLICATIONS

Amento et al., TopicShop: Enchanced Support for Evaluating and Organizing Collections of Web sites, 2000, ACM, pp. 201-209.*

(Continued)

*Primary Examiner*—Stephen Hong
*Assistant Examiner*—Manglesh M. Patel
(74) *Attorney, Agent, or Firm*—Staas & Halsey LLP

(57) ABSTRACT

An evaluation apparatus learns the correspondence between domains and evaluation items from a Web page group in Internet, generates an evaluation set group, and generates a specified domain evaluation set by extracting evaluation items corresponding to the specified domain from the evaluation set group. Then, it evaluates a Web page to be evaluated based on the specified domain evaluation set.

23 Claims, 40 Drawing Sheets

FOREIGN PATENT DOCUMENTS

| WO | 01/75678 | 10/2001 |
| WO | 03/005235 | 1/2003 |

OTHER PUBLICATIONS

Isao Takahashi et al., Hierarchical Summarizing and Evaluating for Web Pages, 2007, ICDT Workshop on Emerging Research Opportunities in Web Data Management, pp. 1-15.*

Miller et al., Z computational Model of Web Navigation Exploring Interactions Between Hierarchical Depth and Link Ambiguity, Apr. 17, 2001, facweb, pp. 1-11.*

J. Alexander et al., "Evaluating Web Resources" http://www2.widener.edu/Wolfgram-Memorial-Libarary/webevaluation/webeval.htm, 1996.

Chinese Office Action for corresponding Chinese Application No. 03106388.8 dated Jul. 8, 2005.

N. Otsuka et al., "Design of a website rating system applying a browsing support tool WIAS", 3-373, The 62$^{nd}$ (Early 2001) national convention, Information Processing Society of Japan.

H. Hiraishi et al., "Special feature: Library evaluation and Library statistics. Evaluating method for information system of library - Evaluation from website of library-", pp. 344-348, vol. 51, No. 6, The Journal of Information Science and Technology Assocation.

K. Hirota et al., "Ontology-Driven Information Extraction", pp. 1010-1018, vol. 14, No. 6, Journal of the Japan Society for Artificial Intelligence.

Japanese Patent Office Notice of Rejection Ground, mailed Jan. 22, 2008 and issued in corresponding Japanese Patent Application No. 2002-313711.

* cited by examiner

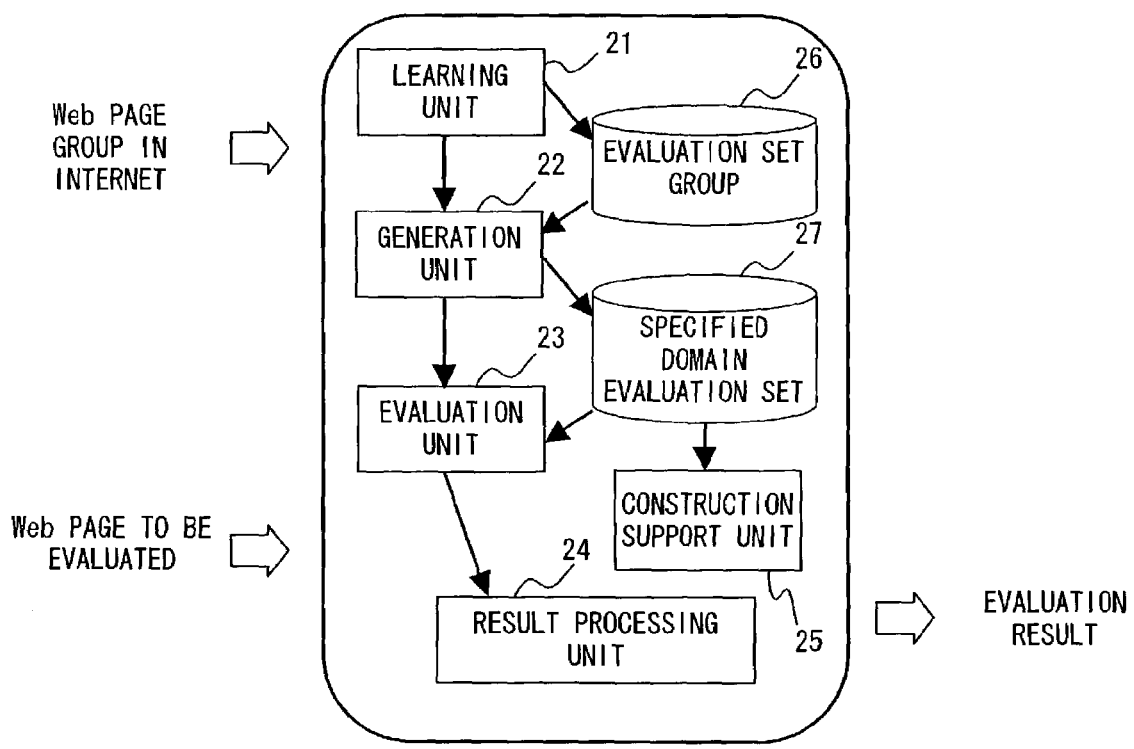
F I G. 1

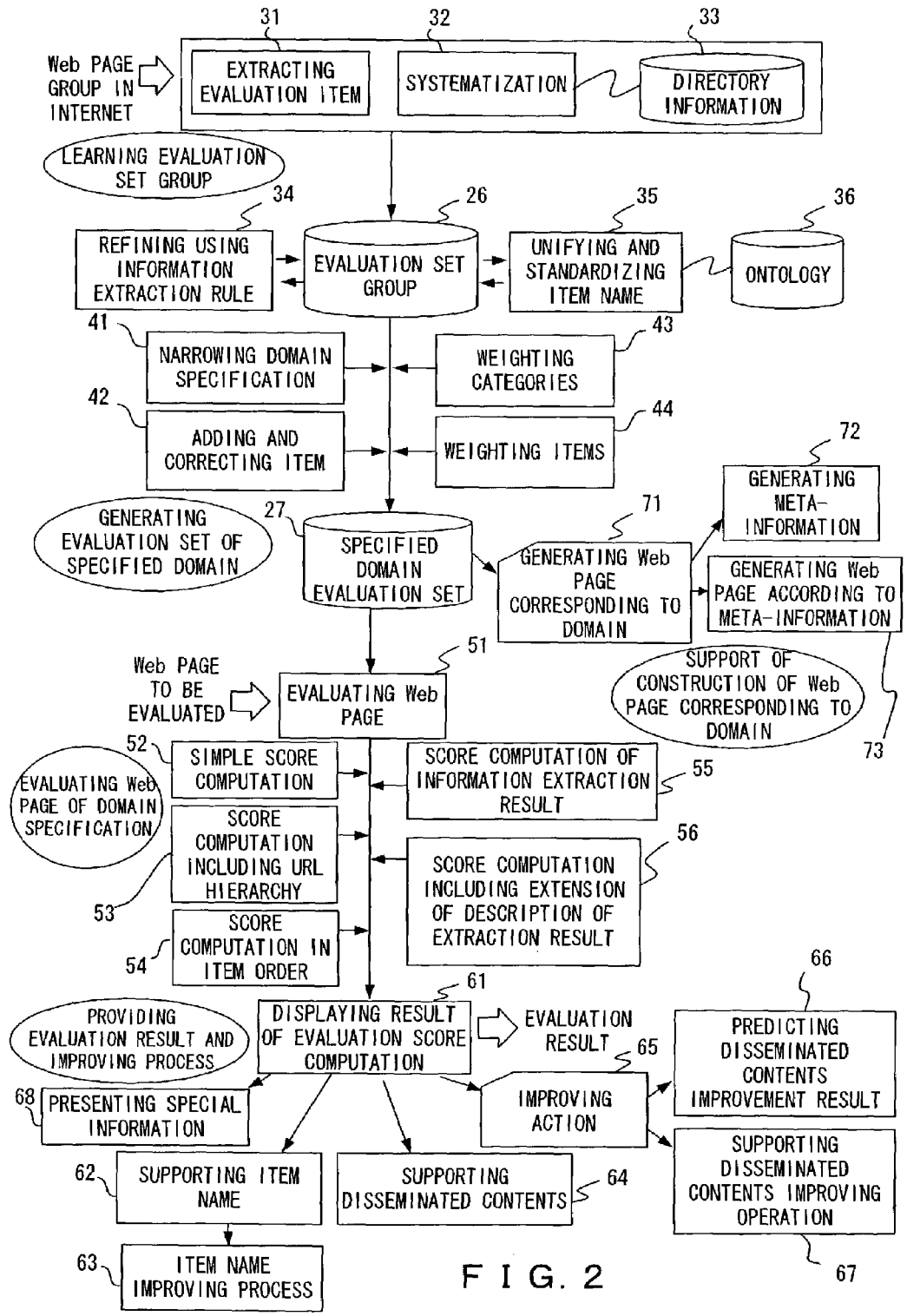
F I G. 2

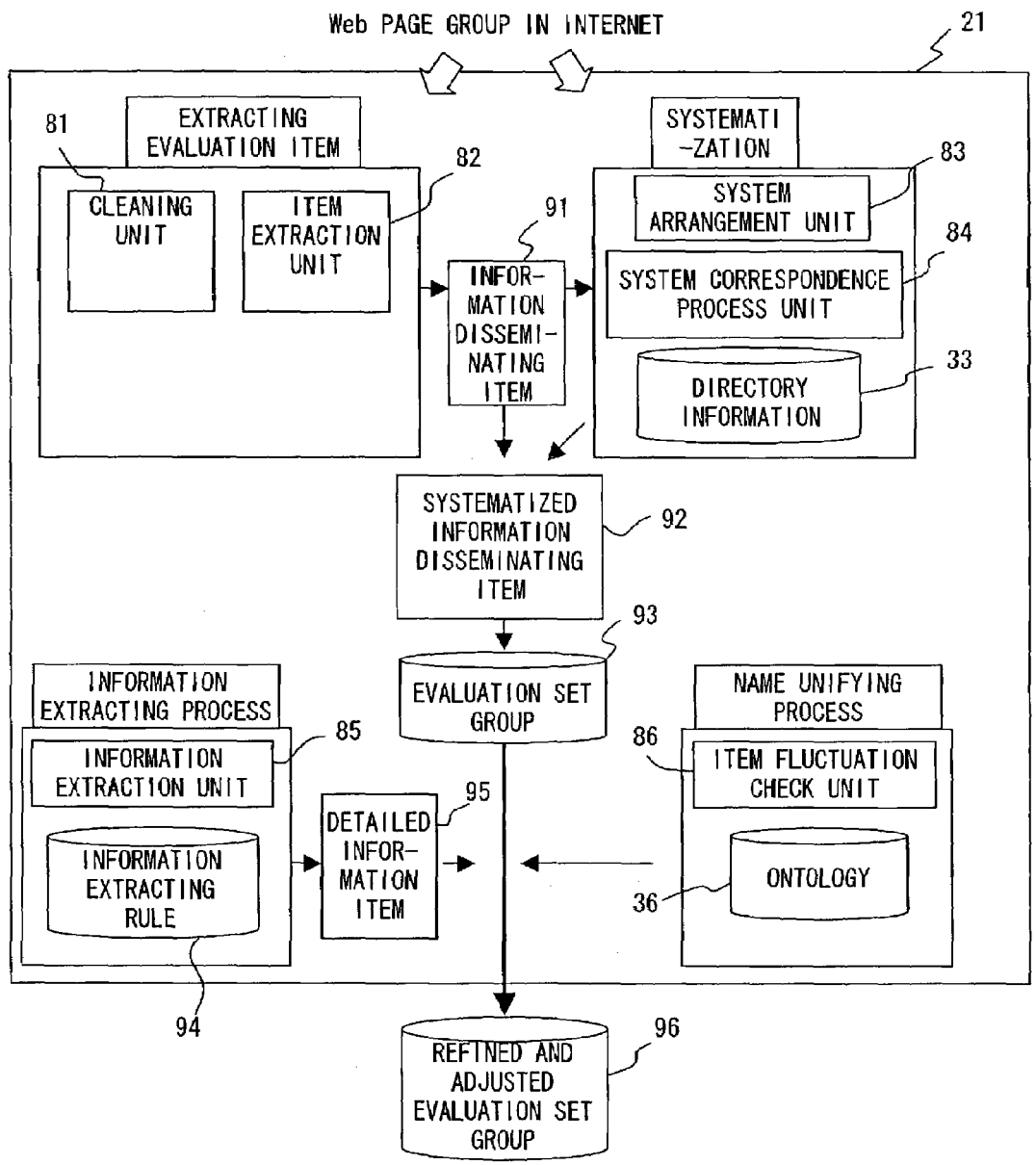
F I G. 3

FIG. 4

```
<A href="news/index-j.html" onMouseOver = "changeTAG(0)" onMouseOut = "hideall()"><img src="image/sw01.gif" alt="NEWS/ANNOUCEMENT"border="0" name="sw0"></A><br>
<A href="prof/index-j.html" onMouseOver = "changeTAG(1)" onMouseOut = "hideall()"><img src="image/sw02.gif" alt="COMPANY INFORMATION"border="0" name="sw1"></A><br>
<A href="ir/index-j.html" onMouseOver = "changeTAG(2)" onMouseOut = "hideall()"><img src="image/sw03.gif" alt="INVESTOR INFORMATION"border="0" name="sw2"></A><br>
<A href="tech/index-j.html"><img src="image/sw04-0.gif"alt="TECHNOLOGY/SERVICE"border="0"></A><br>
<A href="tech/index.html#03" onMouseOver = "changeTAG(5)" onMouseOut = "hideall()"><img src="image/sw06.gif"alt="CONSULTING SERVICE" border="0" name="sw5"></A><br>
```

```
<TABLE WIDTH="580"BORDER="0" CELLSPACING="10"CELLPADDING="0">
  <TR>
    <TD width="100"> </TD>
101 <TD WIDTH="150"VALIGN="TOP"><B>●FOUNDATION</B></TD>
    <TD WIDTH="290"VALIGN="TOP">1841(TEMPO 12)</TD>
  </TR>
  <TR>
    <TD width="100"></TD>
    <TD VALIGN="TOP"width="150"><B>●ESTABLISHMENT</B></TD>
    <TD VALIGN="TOP"width="290">1931(SHOWA 6)</TD>
  </TR>
  <TR>
    <TD width="100"></TD>
    <TD VALIGN="TOP"width="150"><B>●REPRESENTATIVE DIRECTOR & HONORARY CHAIRMAN
      OF THE BOARD</B></TD>
    <TD VALIGN="TOP"width="290">○○ TARO</TD>
  </TR>
  <TR>
    <TD width="100"></TD>
    <TD VALIGN="TOP"width="150"><B>●REPRESENTATIVE DIRECTOR & PRESIDENT
      </B></TD>
    <TD VALIGN="TOP"width="290">○○ JIRO</TD>
  </TR>
  <TR>
    <TD width="100"></TD>
    <TD VALIGN="TOP"width="150"><B>●CAPITAL</B></TD>
    <TD VALIGN="TOP"width="290">120 BILLION YEN</TD>
  </TR>
  <TR>
    <TD width="100"></TD>
    <TD VALIGN="TOP" width="150"><B>●NUMBER OF EMPLOYEES</B></TD>
    <TD VALIGN="TOP" width="290"> AS OF END OF MARCH IN 2000・54,321<br>
(NUMBER OF EMPLOYEES INCLUDING TRANSFER EMPLOYEES AND OVERSEAS STUDENTS IS
65,432)</TD>
  </TR>
</TABLE>
```

F I G. 5

Figure 6:
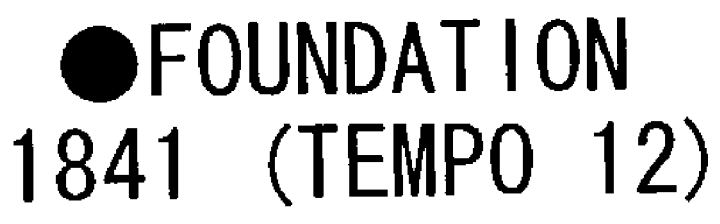

●FOUNDATION
1841 (TEMPO 12)

| CATEGORY 1 | CATEGORY 2 | CATEGORY 3 | CATEGORY 4 | CATEGORY 5 | CATEGORY 6 |
|---|---|---|---|---|---|
| INDUSTRY | PRIMARY INDUSTRY | AGRICULTURE | | | |
| INDUSTRY | PRIMARY INDUSTRY | FISHING | | | |
| INDUSTRY | PRIMARY INDUSTRY | LIVESTOCK INDUSTRY | | | |
| INDUSTRY | PRIMARY INDUSTRY | FORESTRY | | | |
| INDUSTRY | PRIMARY INDUSTRY | HUNTING | | | |
| INDUSTRY | SECONDARY INDUSTRY | MANUFACTURING | FOOD MANUFACTURER | | |
| INDUSTRY | SECONDARY INDUSTRY | MANUFACTURING | CHEMICAL MANUFACTURER | | |
| INDUSTRY | SECONDARY INDUSTRY | MANUFACTURING | PHARMACEUTICAL MANUFACTURER | | |
| INDUSTRY | SECONDARY INDUSTRY | MANUFACTURING | TEXTILE MANUFACTURER | | |
| INDUSTRY | SECONDARY INDUSTRY | MANUFACTURING | GLASS/STONE MANUFACTURER | | |
| INDUSTRY | SECONDARY INDUSTRY | MANUFACTURING | RUBBER PRODUCT MANUFACTURER | | |
| INDUSTRY | SECONDARY INDUSTRY | MANUFACTURING | OIL INDUSTRY | | |
| INDUSTRY | SECONDARY INDUSTRY | MANUFACTURING | PULP/PAPER MANUFACTURER | | |
| INDUSTRY | SECONDARY INDUSTRY | MANUFACTURING | STEEL MANUFACTURER | | |
| INDUSTRY | SECONDARY INDUSTRY | MANUFACTURING | NONFERROUS METAL MANUFACTURER | | |
| INDUSTRY | SECONDARY INDUSTRY | MANUFACTURING | METAL PRODUCT MANUFACTURER | | |
| INDUSTRY | SECONDARY INDUSTRY | MANUFACTURING | MACHINE MANUFACTURER | | |
| INDUSTRY | SECONDARY INDUSTRY | MANUFACTURING | PRECISION MACHINE MANUFACTURER | | |
| INDUSTRY | SECONDARY INDUSTRY | MANUFACTURING | PRECISION MACHINE MANUFACTURER | CAMERA MANUFACTURER | |
| INDUSTRY | SECONDARY INDUSTRY | MANUFACTURING | ELECTRIC APPLIANCE MANUFACTURER | | |
| INDUSTRY | SECONDARY INDUSTRY | MANUFACTURING | TRANSPORTATION MACHINE MANUFACTURER | | |
| INDUSTRY | SECONDARY INDUSTRY | MANUFACTURING | TRANSPORTATION MACHINE MANUFACTURER | AUTOMOBILE MANUFACTURER | |
| INDUSTRY | SECONDARY INDUSTRY | MANUFACTURING | TRANSPORTATION MACHINE MANUFACTURER | AUTOMOBILE MANUFACTURER | COMPANY M |
| INDUSTRY | SECONDARY INDUSTRY | MANUFACTURING | TRANSPORTATION MACHINE MANUFACTURER | AUTOMOBILE MANUFACTURER | COMPANY N |
| INDUSTRY | SECONDARY INDUSTRY | MANUFACTURING | TRANSPORTATION MACHINE MANUFACTURER | AUTOMOBILE MANUFACTURER | COMPANY O |
| INDUSTRY | SECONDARY INDUSTRY | MANUFACTURING | TRANSPORTATION MACHINE MANUFACTURER | AUTOMOBILE MANUFACTURER | COMPANY P |
| INDUSTRY | SECONDARY INDUSTRY | GAS/ELECTRICITY/WATER SUPPLY | GAS SUPPLY COMPANY | | |
| INDUSTRY | SECONDARY INDUSTRY | GAS/ELECTRICITY/WATER SUPPLY | ELECTRIC POWER COMPANY | | |
| INDUSTRY | SECONDARY INDUSTRY | GAS/ELECTRICITY/WATER SUPPLY | WATER SUPPLY COMPANY | | |
| INDUSTRY | TERTIARY INDUSTRY | COMMUNICATIONS | TELEPHONE COMPANY | | |
| INDUSTRY | TERTIARY INDUSTRY | COMMUNICATIONS | TELEVISION BROADCASTER | | |
| INDUSTRY | TERTIARY INDUSTRY | COMMUNICATIONS | RADIO BROADCASTER | | |
| INDUSTRY | TERTIARY INDUSTRY | COMMUNICATIONS | PROVIDER | | |
| INDUSTRY | TERTIARY INDUSTRY | TRADE | TRADING COMPANY | | |
| INDUSTRY | TERTIARY INDUSTRY | TRADE | STORE | | |
| INDUSTRY | TERTIARY INDUSTRY | TRADE | | | |
| INDUSTRY | TERTIARY INDUSTRY | SERVICE INDUSTRY | AGENCY | | |
| INDUSTRY | TERTIARY INDUSTRY | SERVICE INDUSTRY | HOUSEKEEPING SERVICE COMPANY | | |
| INDUSTRY | TERTIARY INDUSTRY | SERVICE INDUSTRY | TRAVEL BUREAU | | |

FIG. 8

| CATEGORY | ENTERPRISE | url | COMMON ITEM |
|---|---|---|---|
| FOOD MANUFACTURER | | | NEW ARRIVALS, RELEASE, COMPANY PROFILE, EMPLOYMENT, CAMPAIGN, ENVIRONMENT, SALES RESULT, COMMODITIES, INQUIRY, INFORMATION IN FOREIGN LANGUAGE. |
| | COMPANY A | URL OF COMPANY A | What's new→more info(DETAIL), CORPORATE INFORMATION, CORPORATE INFORMATION, EVENT/ CAMPAIGN INFORMATION, ENVIRONMENT/MECENAT, IR INFORMATION, COMMODITY LIST, OPINION/ INQUIRY, "English, Chinese". |
| | COMPANY B | URL OF COMPANY B | What's new→more info(DETAILED), NEWS RELEASE, COMPANY GUIDE, EMPLOYMENT INFORMATION, CAMPAIGN/EVENT, ENVIRONMENT MAINTENANCE STRATEGY, COMMODITY INTRODUCTION, CUSTOMER CONSULTING ROOM, ENGLISH. |
| | COMPANY C | URL OF COMPANY C | What's new, NEWS/PRESS RELEASE, COMPANY INFORMATION, EMPLOYMENT INFORMATION, REFRESHMENT/FOODS→CAMPAIGN INFORMATION, STRATEGY FOR ENVIRONMENT PROBLEM, SETTLEMENT REPORT, REFRESHMENT/FOODS, ADDRESS OF OPINION AND INQUIRY AFTER VIEWING THIS HOME PAGE, ENGLISH. |
| | COMPANY D | URL OF COMPANY D | NEW ARRIVAL INFORMATION, PRESS RELEASE, COMPANY GUIDE, COMPANY GUIDE→EMPLOYMENT INFORMATION, PRESENT CAMPAIGN, COMPANY GUIDE→STRATEGY FOR ENVIRONMENT, IR INFORMATION (COMPANY SALES RESULT), GUIDE TO COMMODITIES AND ADVERTISEMENT, INQUIRY, GlobalVersion (ENGLISH). |
| | COMPANY E | URL OF COMPANY E | ANNOUNCEMENT, 'NEW' MARK ON EACH ITEM, NEWS RELEASE, COMPANY INFORMATION (COMPANY PROFILE), COMPANY INFORMATION (TO STUDENTS), CAMPAIGN, INVESTOR RELATIONS, COMMODITY INTRODUCTION, COLUMN FOR CUSTOMER→INQUIRY BY MAIL, CUSTOMER CENTER (Q&A), English. |
| | COMPANY F | URL OF COMPANY F | What's new, LATEST NEWS, COMPANY GUIDE, EMPLOYMENT INFORMATION, STRATEGY FOR ENVIRONMENT, IR INFORMATION, COMMODITY ILLUSTRATION, INQUIRY/Q&A, English. |
| | COMPANY G | URL OF COMPANY G | NEW ARRIVAL INFORMATION, DISTRIBUTED TO TOP, PRODUCT INFORMATION, SALES INFORMATION, COMPANY INFORMATION, EMPLOYMENT INFORMATION, CAMPAIGN, SETTLEMENT INFORMATION, PRODUCT INFORMATION. |

FIG. 9

| SPECIFIC ITEM | INDIVIDUAL ITEM |
|---|---|
| PLANT TOUR, top TEXT MESSAGE, SHOP(INTERNET), IMAGE CHARACTER, RECIPE, HEALTH. | |
| PLANT TOUR GUIDE, SAFETY OF COMMODITIES OF COMPANY A GROUP RELATING TO BSE PROBLEM, SHOPS OF COMPANY A, IMAGE GIRL, COMPANY A-fan.com→LET'S ENJOY FOODS AND LIQUOR→ RECIPE, COMPANY A-fan.com→LET'S WALK.COM, | site map, my nabi, LINK TO INTRA-GROUP COMPANY(EACH ITEM), OPINION/INQUIRY, RESTAURANT SITE, MonthlyAccessRanking, CAMPAIGN AGAINST RAISE OF TAX |
| PLANT GUIDE, SAFETY OF OUR PRODUCTS RELATING TO BSE PROBLEM, ON-LINE SHOP, GOURMET GUIDE→GOURMET RECEIPE, GOOD-DAY HEALTHY FOODS, HOW TO GO WELL WITH LIQUOR. | ON AIR RECOMMENDED SITE ·WhiskyWeb ·WEB NIGHT BAR FLOWERS AND TALKS ·e-wine ·CLUB MALTS ·SQUARE FOR ALL ·LET'S DRINK SHOCHU! ·DIGITAL PRESENT. COMPANY B GROUP, MOBILE PHONE, CM, TOPICS ON LIQUOR, ARTS, CULTURE, AND SPORTS (EACH SITE) |
| SAFETY OF OUR PRODUCTS CONTAINING BEEF, SHOPPING CORNER, REFRESHMENT/FOODS→○○VILLAGE, USEFUL HEALTH INFORMATION, | SPORTS FOOD, INFORMATION ABOUT CHOCOLATE, NEW MATERIAL BUSINESS, PHARMACEUTICAL BUSINESS OF COMPANY C, AGRICULTURAL MATERIAL, MUSHROOM BUSINESS |
| 2001/10/17 INFORMATION ABOUT CONFIRMATION OF SAFETY OF PRODUCTS CONTAINING BEEF, ONLINE SHOPPING, COMMODITIES AND ADVERTISEMENT, RECIPE ENCYCLOPEDIA, 6000 MENUS, ALL ABOUT AMINO ACID | SITE MAP, IMPACT, PRIVACY POLICY, GlobalVersion, AMINOVITAL SITE, ONLINE SHOPPING, RECIPE ENCYCLOPEDIA |
| PLANT TOUR GUIDE, BSE RELATED INFORMATION, COOKING RECIPE, FOODS AND HEALTH→HEALTHY LIFE LAB, ·MBP ·BodyNavi ·VEGETABLE SHOP ·SNOW MAGAZINE, | CHEESE CLUB OF COMPANY E, FOODS AND HEALTH, COOKING RECIPE, HOME DELIVERY OF MILK, EACH INDIVIDUAL SITE |
| PLANT TOUR GUIDE, SAFETY OF OUR PRODUCTS RELATING TO BSE, HEALTHY FOOD SHOP OF COMPANY F, Hi Line TSUYARI GROUP, COMPANY F, IT'S A PROBIOTEX HEALTHY METHOD, | COSMETICS, MEDICINE FOR INTESTINAL DISORDERS OF COMPANY F, Links, SITE MAP, HEALTHY FOOD SHOP OF COMPANY F, INDIVIDUAL SITE |
| STARTING TOUR IN BREAD PLANT, DELIVERY OF BREAD (THROUGH NETWORK), SAFETY OF OUR PRODUCTS RELATING TO BSE PROBLEM, SHOP/GIFT SELECTION OF COMPANY G, PRODUCT INFORMATION→ ROLLED SANDWICH→SUSIE, RECIPE OF BREAD, | STORE INFORMATION, WORLD OF BREAD |

| CATEGORY | ENTERPRISE | url | COMMON ITEM |
|---|---|---|---|
| COSMETIC MANUFACTURER | | | NEW ARRIVALS, RELEASE, COMPANY PROFILE, EMPLOYMENT, CAMPAIGN ENVIRONMENT, SALES RESULT, COMMODITIES, INQUIRY, INFORMATION IN FOREIGN LANGUAGE. |
| | COMPANY H | URL OF COMPANY H | NEW ARRIVAL INFORMATION, NEW COMMODITIES OF THIS MONTH, CORPORATE ACTIVITIES, CORPORATE ACTIVITIES (EMPLOYMENT INFORMATION), CORPORATE INFORMATION (STRATEGY FOR ENVIRONMENT), CORPORATE ACTIVITIES (FINANCIAL/IR INFORMATION), ABOUT COMMODITIES, COMMODITY RETRIEVAL, COMMODITY ADVICE COUNTER, INQUIRY, GlobalSites(·English ·French ·German ·Italian ·Spanish ·Portuguese ·Trad. Mandarin). |
| | COMPANY I | URL OF COMPANY I | NEW ARRIVAL INFORMATION, IR INFORMATION→NEWS RELEASE, IR INFORMATION(COMPANY GUIDE), EMPLOYMENT INFORMATION, web COMPANY I→AUTUMN BEAUTY CAMPAIGN, IR INFORMATION, COMMODITY GUIDE, INQUIRY, English version is here, |
| | COMPANY J | URL OF COMPANY J | NEW ARRIVAL INFORMATION, CORPORATE INFORMATION, EMPLOYMENT INFORMATION, EVENT GUIDE, CORPORATE INFORMATION (ENVIRONMENT REPORT), IR INFORMATION, AnnualReport, Select a Band, CORPORATE INFORMATION(CUSTOMER CONSULTATION ROOM), English, |
| | COMPANY L | URL OF COMPANY L | What'sNew!, NEWS RELEASE, COMPANY GUIDE, EMPLOYMENT INFORMATION, PRODUCTS AND CAMPAIGN, STRATEGY FOR ENVIRONMENT, INVESTOR INFORMATION, INDUSTRIAL CHEMICAL PRODUCTS, INDUSTRIAL PRODUCTS, PRODUCT GUIDE, COMPANY L PRODUCT CONSULTING ROOM, English, |

F I G. 1 0

| SPECIFIC ITEM | INDIVIDUAL ITEM |
|---|---|
| BEAUTY, FASHION, COUNSELING, DISPLAY OF INGREDIENT OF COSMETICS | |
| BEAUTY AND FASHION TO LIVE A BEAUTIFUL LIFE, BEAUTY COMMUNICATIONS, BEAUTY AND FASHION, SKIN VISION→CORPORATE INFORMATION→DISPLAY OF ALL INGREDIENTS OF COSMETICS, | CULTURAL ACTIVITIES, SITE RETRIEVAL, +W+M MEMBER, MAIL DISTRIBUTION, WEATHER AND UV FORECAST, IMODE, jSKY, INTERNET SHOP, GROUP SITE OF COMPANY H |
| BEAUTY INFORMATION, web COMPANY I→BEAUTY INFO. web COMPANY I→COSMETICS Q&A→DISPLAY AND INGREDIENT OF COSMETICS | RELEVANT BUSINESS, RESTAURANT, web COMPANY I |
| BEAUTY INFORMATION, CLUB J→ClubLips (MEMBERSHIP), BEAUTEdeJ→COUNSELING, CORPORATE INFORMATION→CUSTOMER COUNSELING ROOM→BRIEF EXPLANATION OF DISPLAY OF ALL INGREDIENTS | SITE MAP, SITE FOR MOBILE PHONE |
| BEAUTY/HEALTH/LIVING INFORMATION, COMPANY L→SkinCare→ SKIN CARE COURSE, DISPLAY INFORMATION OF ALL INGREDIENTS OF COSMETICS | LIVING AND CULTURAL STUDY, SITE MAP, COMPANY L |

F I G. 1 1

| CATEGORY | ENTERPRISE | url | COMMON ITEM |
|---|---|---|---|
| AUTOMOBILE MANUFACTURER | | | NEW ARRIVALS, RELEASE, COMPANY PROFILE, EMPLOYMENT, CAMPAIGN, ENVIRONMENT, SALES RESULT, COMMODITIES, INQUIRY, INFORMATION IN FOREIGN LANGUAGE. |
| | COMPANY M | URL OF COMPANY M | News, TOPICS, CORPORATE INFORMATION, EMPLOYMENT INFORMATION, PRESENT INFORMATION, STRATEGY FOR ENVIRONMENT, INFORMATION FOR INVESTORS, SHOWROOM, INQUIRY, ENGLISH |
| | COMPANY N | URL OF COMPANY N | Hot News, PUBLIC RELATIONS(PressRoom), COMPANY GUIDE(Guido to COMPANY N), JOB INFORMATION(Jobs), HOW TO USE THIS SITE→PRESENT INFORMATION, ENVIRONMENT(Environment), TO INVESTORS(Investors), Automobiles, Motorcycles, PowerProducts, CUSTOMER CONSULTING CENTER(Customer), COMPANY N Worldwide site |
| | COMPANY O | URL OF COMPANY O | NEWS OF COMPANY O, NEWS OF COMPANY O→NEW CAR INFORMATION, CORPORATE INFORMATION, CORPORATE INFORMATION→EMPLOYMENT INFORMATION OF COMPANY O, NEWS OF COMPANY O→CAMPAIGN INFORMATION, CORPORATE INFORMATION→ STRATEGY FOR ENVIRONMENT, CORPORATE INFORMATION→ AnnualReport(ENGLISH), CAR LINEUP CARVIEW, SITE GUIDE→INQUIRY, CORPORATE INFORMATION AND LINK TO OVERSEAS |
| | COMPANY P | URL OF COMPANY P | NEWS OF COMPANY P, NEWS OF COMPANY P→NEW CAR NEWS, CORPORATE INFORMATION, CORPORATE INFORMATION→EMPLOYMENT INFORMATION, NEWS OF COMPANY P→EVENT NEWS, CORPORATE INFORMATION→STRATEGY FOR ENVIRONMENT, CORPORATE INFORMATION→TO INVESTORS, VEHICLES, SMALL CARS, TRUCKS, BUSES, USED CARS, SUPPORT FOR CUSTOMERS, ENGLISH, Corporate News, Worldwide Distributors |

FIG. 12

| SPECIFIC ITEM | INDIVIDUAL ITEM |
|---|---|
| PLANT TOUR, RECALL, SAFETY, USED CARS, RENTAL, PURCHASE SUPPORT, DEALER, MOTOR SHOW (EVENT) | |
| PLANT TOUR, CAR LIFE(RECALL INFORMATION), CORPORATE INFORMATION→STRATEGY FOR SAFETY, PURCHASE OF CARS/U-Car(USED CARS), RENTAL(RESERVATION/ESTIMATION), PURCHASE SUPPORT, SHOPS OF COMPANY M, MOTOR SPORTS NEWS, EVENT INFORMATION | CAR LIFE, COMPANY M OTHER THAN CARS, GAZOO, PAVILION OF COMPANY M, REGISTRATION IN MAIL MAGAZINE, SITE MAP, INFORMATION BEFORE USING |
| PLANT TOUR(Kengaku), INFORMATION ABOUT RECALL IMPROVEMENT PLAN, ETC., SAFETY, Automobiles(USED CAR STOCK RETRIEVAL),Automobiles→EXCLUSIVE RESERVATION FOR CAR RENTAL OF COMPANY N, NEGOTIATION SUPPORT(GENERAL PURPOSE PRODUCTS ONLY), Automobiles→DealerLocator, "MotorSports, MOTOR SHOW" | SiteMap, i-mode, Technology,GROUP OF COMPANY N, MESSAGE OF COMPANY N, FAN SITE OF COMPANY N, HISTORY OF COMPANY N, FACILITY INFORMATION, SOCIAL ACTIVITIES, MAIL SERVICE OF COMPANY N, web SERVICE OF COMPANY N, TVCM, PRESENTED PROGRAM, HOW TO USE THIS SITE, FAQ, Feedback, Search |
| EVENT/FACILITIES→PLANT TOUR, RECALL INFORMATION, USED CAR RETRIEVAL, CAR LIFE SUPPORT→CAR RENTAL COMPANY O, PURCHASE SUPPORT, ESTIMATION, GUIDE TO SHOPS OF COMPANY O, EVENT/FACILITIES→COMPANY O GALLERY | CAR LIFE SUPPORT, ENTERTAINMENT, SITE GUIDE, PASSPORT MEMBER REGISTRATION/CHANGE, REQUEST FOR CATALOG, GUIDE TO SHOPS OF COMPANY O, RETRIEVAL FOR TRIAL DRIVING |
| CUSTOMER SUPPORT→RECALL INFORMATION, QUALITY OF 'SAFETY' TO SMALL CARS, CUSTOMER SUPPORT→SAFE DRIVING COURSE?, USED CARS, VEHICLES/SMALL CARS→SEARCH FOR CAR→SEARCH ON CONDITION, VARIOUS APPLICATIONS, GUIDE TO DEALERS, MOTOR SPORTS, 35TH TOKYO MOTOR SHOW 2001 | FREE CALL, SITE INDEX, LINK LIST |

FIG. 13

```
<ANNUNCIATOR ORGANIZATION INFORMATION>
<TABLE WIDTH="580"BORDER="0"CELLSPACING="10"CELLPADDDING="0">
  <TR>
    <TD width="100"> </TD>
    <TD WIDTH="150" VALIGN="TOP"><B><FOUNDATION INFORMATION>●FOUNDATION</B></TD>
    <TD WIDTH="290" VALIGN="TOP"><ELEMENT1 NUMBER OF ELEMENTS=1 type=ELEMENT><DATE OF
FOUNDATION>1841(TEMPO 12)</DATE OF FOUNDATION></ELEMENT1></FOUNDATION INFORMATION>
</TD>
  </TR>
  <TR>
    <TD width="100"></TD>
    <TD VALIGN="TOP"width="150"><B><ESTABLISHMENT INFORMATION>●ESTABLISHMENT</B></TD>
    <TD VALIGN="TOP"width="290"><ELEMENT1 NUMBER OF ELEMENTS=1 type=ELEMENT><DATE OF
       ESTABLISHMENT>1931(SHOWA 6)</DATE OF ESTABLISHMENT></ELEMENT 1></ESTABLISHMENT
INFORMATION></TD>
  </TR>
  <TR>
    <TD width="100"></TD>
    <TD VALIGN="TOP" width="150"><B><UNCERTAIN ORGANIZATION SUPPLEMENTARY INFORMATION
       type=ORGANIZATION SUPPLEMENTARY INFORMATION>●REPRESENTATIVE DIRECTOR & CHAIRMAN
       OF THE BOARD</B></TD>
    <TD VALIGN="TOP" width="290"><ELEMENT1 NUMBER OF ELEMENTS=1 type=ELEMENT><OTHER
       INFORMATION>○○TARO</OTHER INFORMATION></ELEMENT1><UNCERTAIN ORGANIZATION
       SUPPLEMENTARY INFORMATION></TD>
  </TR>
  <TR>
    <TD width="100"></TD>
    <TD VALIGN="TOP" width="150"><B><UNCERTAIN ORGANIZATION SUPPLEMENTARY INFORMATION
type=ORGANIZATION SUPPLEMENTARY INFORMATION type=ORGANIZATION SUPPLEMENTARY INFORMATION>●
REPRESENTATIVE DIRECTOR & PRESIDENT</B></TD>
    <TD VALIGN="TOP" width="200"><ELEMENT1 NUMBER OF ELEMENTS=1 type=ELEMENT><PRESIDENT
INFORMATION>○○ JIRO</PRESIDENT INFORMATION></ELEMENT1></UNCERTAIN ORGANIZATION
SUPPLEMENTARY INFORMATION></TD>
  </TR>
  <TR>
    <TD width="100"></TD>
    <TD VALIGN="TOP" width"150"><B><UNCERTAIN ORGANIZATION SUPPLEMENTARY INFORMATION type=
ORGANIZATION SUPPLEMENTARY INFORMATION>●CAPITAL
    </B></TD>
    <TD VALIGN="TOP"width="290"><ELEMENT1 NUMBER OF ELEMENTS=1 type=ELEMENT><CAPITAL
INFORMATION>120 BILLION YEN</CAPITAL INFORMATION></ELEMENT1></UNCERTAIN   ORGANIZATION
SUPPLEMENTARY INFORMATION></TD>
    </TR>
    <TR>
    <TD width="100"></TD>
    <TD VALIGN="TOP" width="150"><B><UNCERTAIN ORGANIZATION SUPPLEMENTARY INFORMATION
       type=ORGANIZATION SUPPLEMENTARY INFORMATION>●NUMBER OF EMPLOYEES
    </B></TD>
    <TD VALIGN="TOP"width="290"><ELEMENT1 NUMBER OF ELEMENTS=1 type ELEMENT><EMPLOYEE
INFORMATION>AS OF END OF MARCH IN 2000.54,321</EMPLOYEE INFORMATION></ELEMENT1><UNCERTAIN
ORGANIZATION SUPPLEMENTARY INFORMATION><br>
(NUMBER OF EMPLOYEES INCLUDING TRANSFER EMPLOYEES AND OVERSEAS STUDENTS IS 65,432) </TD>
   </TR>
</TABLE>
</ANNUNCIATOR ORGANIZATION INFORMATION>
```

FIG. 14

INFORMATION DISSEMINATING ITEM NAME:COMPANY PROFILE
↓ DETAILING
DETAILED INFORMATION ITEM:COMPANY NAME, ADDRESS, TELEPHONE NUMBER,
REPRESENTATIVE (PRESIDENT), CAPITAL,
FOUNDATION YEAR, ESTABLISHMENT YEAR, NUMBER OF EMPLOYEES, ⋯

FIG. 15

INFORMATION DISSEMINATING ITEM NAME:PRODUCT INFORMATION
↓ DETAILING
DETAILED INFORMATION ITEM:PRODUCT NAME, TYPE INFORMATION, PRODUCT SUPPLEMENTARY INFORMATION, MANUFACTURED PRODUCT INFORMATION, MANUFACTURING ORGANIZATION INFORMATION, MANUFACTURING ORGANIZATION SUPPLEMENTARY INFORMATION, . . .

| CATEGORY | REPRESENTATIVE NAME | PROSPECT |
|---|---|---|
| FOOD MANUFACTURER | NEW ARRIVALS | What's new→more info(DETAIL), NEW ARRIVAL INFORMATION, "New" MARK ON EACH ITEM. |
| | RELEASE | NEWS RELEASE, NEWS/PRESS RELEASE. |
| | COMPANY PROFILE | CORPORATE INFORMATION, COMPANY GUIDE, COMPANY INFORMATION(COMPANY PROFILE). |
| | EMPLOYMENT | CORPORATE INFORMATION, EMPLOYMENT INFORMATION, COMPANY INFORMATION, COMPANY GUIDE→EMPLOYMENT INFORMATION, COMPANY INFORMATION(TO STUDENTS). |
| | CAMPAIGN | EVENT/CAMPAIGN INFORMATION, CAMPAIGN/EVENT, REFRESHMENT/FOODS→ CAMPAIGN INFORMATION, PRESENT CAMPAIGN, CAMPAIGN. |
| | ENVIRONMENT | ENVIRONMENT/MECENAT, ENVIRONMENT MAINTENANCE STRATEGY, STRATEGY FOR ENVIRONMENT PROBLEM, COMPANY GUIDE→STRATEGY FOR ENVIRONMENT. |
| | SALES RESULT | IR INFORMATION, SETTLEMENT REPORT, IR INFORMATION(COMPANY SALES RESULT), INVESTOR RELATIONS, SETTLEMENT INFORMATION. |
| | COMMODITIES | COMMODITY LIST, COMMODITY INTRODUCTION, REFRESHMENT/FOODS, GUIDE TO COMMODITIES AND ADVERTISEMENT, COMMODITY INFORMATION, PRODUCT INFORMATION. |
| | INQUIRY | OPINION/INQUIRY, ADDRESS OF OPINION AND INQUIRY AFTER VIEWING THIS HOME PAGE, INQUIRY, COLUMN FOR CUSTOMER→INQUIRY BY MAIL, CUSTOMER CENTER(Q&A). |
| | INFORMATION IN FOREIGN LANGUAGE | English, Chinese, GlovalVersion(ENGLISH). |
| | PLANT TOUR | PLANT TOUR GUIDE, PLANT TOUR GUIDE, PLANT TOUR GUIDE, STARTING TOUR IN BREAD PLANT. |
| | TOP TEXT MESSAGE | SAFETY OF COMMODITIES OF COMPANY A GROUP RELATING TO BSE PROBLEM, SAFETY OF OUR PRODUCTS RELATING TO BSE PROBLEM, SAFETY OF OUR PRODUCTS CONTAINING BEEF, 2001/10/17 INFORMATION ABOUT CONFIRMATION OF SAFETY OF PRODUCTS CONTAINING BEEF, BSE RELATED INFORMATION |
| | SHOP (INTERNET) | SHOPS OF COMPANY A, ON-LINE SHOP, SHOPPING CORNER, ONLINE SHOPPING, COMMODITIES AND ADVERTISEMENT, SHOP/GIFT SELECTION OF COMPANY B. |
| | IMAGE CHARACTER | IMAGE GIRL |
| | RECIPE | LET'S ENJOY FOODS AND LIQUOR→RECIPE, GOURMET GUIDE→GOURMET RECIPE, RECIPE ENCYCLOPEDIA 6000 MENUS, COOKING RECIPE, RECIPE OF BREAD, |
| | HEALTH | LET'S WALK.COM, GOOD-DAY HEALTHY FOODS, HOW TO GO WELL WITH LIQUOR, USEFUL HEALTH INFORMATION, ALL ABOUT AMINO ACID, FOODS AND HEALTH, |

FIG. 18

| COSMETIC MANUFACTURER | NEW ARRIVALS | NEW ARRIVAL INFORMATION, What'sNew! |
|---|---|---|
| | RELEASE | NEW COMMODITIES THIS MONTH, IR INFORMATION→NEWS RELEASE, NEWS RELEASE. |
| | COMPANY PROFILE | CORPORATE ACTIVITIES, IR INFORMATION(COMPANY GUIDE), CORPORATE INFORMATION, COMPANY GUIDE. |
| | EMPLOYMENT | CORPORATE ACTIVITIES(EMPLOYMENT INFORMATION). |
| | CAMPAIGN | web→AUTUMN BEAUTY CAMPAIGN, EVENT GUIDE, |
| | ENVIRONMENT | CORPORATE INFORMATION(STRATEGY FOR ENVIRONMENT), CORPORATE INFORMATION(ENVIRONMENT REPORT), STRATEGY FOR ENVIRONMENT. |
| | SALES RESULT | CORPORATE ACTIVITIES(FINANCIAL/IR INFORMATION), AnnualReport, INVESTOR INFORMATION. |
| | COMMODITIES | ABOUT COMMODITIES, COMMODITY RETRIEVAL, COMMODITY ADVICE COUNTER. COMMODITY GUIDE, Select a Brand, PRODUCT AND CAMPAIGN, INDUSTRIAL CHEMICAL PRODUCTS, INDUSTRIAL PRODUCTS, PRODUCT GUIDE, |
| | INQUIRY | INQUIRY, CORPORATE INFORMATION(CUSTOMER CONSULTATION ROOM), COMPANY C PRODUCT CONSULTING ROOM, |
| | INFORMATION IN FOREIGN LANGUAGE | GlobalSites(·English ·French ·German ·Italian ·Spainish · Portuguese ·Trad. Mandarin), English version is here. |
| | BEAUTY | BEAUTY AND FASHION TO LIVE A BEAUTIFUL LIFE, BEAUTY COMMUNICATIONS, BEAUTY INFORMATION, BEAUTY/HEALTH/LIVING INFORMATION. |
| | FASHION | BEAUTY AND FASHION, CLUB D→ClubLips(MEMBERSHIP), |
| | COUNSELING | SKIN VISION, COMPANY E→BEAUTY INFO, BEAUTE→COUNSELING, COMPANY F →SkinCare→SKIN CARE COURSE. |
| | DISPLAY OF INGREDIENT OF COSMETICS | CORPORATE INFORMATION→DISPLAY OF ALL INGREDIENTS OF COSMETICS, web CORPORATE G→COSMETICS Q&A→DISPLAY AND INGREDIENT OF COSMETICS, CORPORATE INFORMATION→CUSTOMER COUNSELING ROOM→BRIEF EXPLANATION OF ALL INGREDIENTS, DISPLAY INFORMATION OF ALL INGREDIENTS OF COSMETICS |

| AUTOMOBILE MANUFACTURER | NEW ARRIVALS | News, Hot News, NEWS OF COMPANY H, NEWS OF COMPANY I |
|---|---|---|
| | RELEASE | TOPICS, PUBLIC RELATIONS(PressRoom), NEWS OF COMPANY J→NEW CAR INFORMATION, NEWS OF COMPANY K→NEW CAR NEWS. |
| | COMPANY PROFILE | CORPORATE INFORMATION, COMPANY GUIDE (Guido to COMPANY L). |
| | EMPLOYMENT | EMPLOYMENT INFORMATION, JOB INFORMATION(Jobs), CORPORATE INFORMATION→EMPLOYMENT INFORMATION OF COMPANY N, CORPORATE INFORMATION→EMPLOYMENT INFORMATION |
| | CAMPAIGN | PRESENT INFORMATION, HOW TO USE THIS SITE→PRESENT INFORMATION, NEW OF COMPANY M→ CAMPAIGN INFORMATION, NEWS OF COMPANY N→EVENT NEWS. |
| | ENVIRONMENT | STRATEGY FOR ENVIRONMENT, ENVIRONMENT(Environment), CORPORATE INFORMATION→STRATEGY FOR ENVIRONMENT. |
| | SALES RESULT | INFORMATION FOR INVESTORS, TO INVESTORS(Investors), CORPORATE INFORMATION→ AnnualReport(ENGLISH), CORPORATE INFORMATION→TO INVESTORS, |
| | COMMODITIES | SHOWROOM, Automobiles Motorcycles Power-Products, CAR LINEUP CARVIEW, VEHICLES·SMALL CARS, TRUCKS, BUSES, USED CARS, |
| | INQUIRY | INQUIRY, CUSTOMER CONSULTING CENTER(Customer), SITE GUIDE→INQUIRY, SUPPORT FOR CUSTOMERS, |
| | INFORMATION IN FOREIGN LANGUAGE | ENGLISH, COMPANY O Worldwide site, CORPORATE INFORMATION AND LINK TO OVERSEAS, ENGLISH, Corporate News, Worldwide Distributors, |
| | PLANT TOUR | PLANT TOUR, PLANT TOUR(Kengaku), EVENT/FACILITIES→PLANT TOUR, |
| | RECALL | CAR LIFE(RECALL INFORMATION), INFORMATION ABOUT RECALL IMPROVEMENT PLAN, ETC., RECALL INFORMATION, CUSTOMER SUPPORT→RECALL INFORMATION, |
| | SAFETY | CORPORATE INFORMATION→STRATEGY FOR SAFETY, SAFETY, QUALITY OF "SAFETY" TO SMALL CARS, CUSTOMER SUPPORT→SAFE DRIVING COURSE? |
| | USED CARS | PURCHASE OF CARS/U-Car (USED CARS), Automobiles(USED CAR STOCK RETRIEVAL), USED CAR RETRIEVAL, CAR LIFE SUPPORT→CAR RENTAL COMPANY P, USED CARS, |
| | RENTAL | RENTAL (RESERVATION/ESTIMATION), Automobiles→EXCLUSIVE RESERVATION FOR CAR RENTAL OF COMPANY Q, VEHICLES/SMALL CARS→SEARCH FOR CAR→SEARCH ON CONDITION, |
| | PURCHASE SUPPORT | PURCHASE SUPPORT, NEGOTIATION SUPPORT(GENERAL PURPOSE PRODUCTS ONLY), PURCHASE SUPPORT, ESTIMATION, VARIOUS APPLICATIONS. |
| | DEALER | SHOPS OF COMPANY R, Automobiles→Dealer Locator, GUIDE TO SHOPS OF COMPANY S, GUIDE TO DEALERS, |
| | MOTOR SHOW (EVENT) | MOTOR SPORTS NEWS, EVENT INFORMATION, MotorSports, MOTOR SHOW, EVENT/FACILITIES→ COMPANY T GALLERY, MOTOR SPORTS, 35TH TOKYO MOTOR SHOW 2001, |

| FOOD MANU-FACTURER | ENTER-PRISE NAME | top STRUCTURE | REPRESENTATION OF COMMON top MENU |||||||||| INFORMATION IN FOREIGN LANGUAGE |
|---|---|---|---|---|---|---|---|---|---|---|---|---|---|
| | | | NEW ARRIVALS | RELEASE | COMPANY PROFILE | EMPLOYMENT | CAMPAIGN | ENVIRONMENT | SALES RESULT | COMMODITIES | INQUIRY | |
| | COMPANY A | BANNER DATA, TABLE FORM (TABLA), PLAIN TEXT | What's new →more info (DETAIL) | | CORPORATE NEWS | CORPORATE INFORMATION | EVENT/ CAMPAIGN INFORMATION | ENVIRONMENT/ MECENAT | IR INFORMATION | COMMODITY LIST | OPINION/ INQUIRY | English, Chinese |
| | COMPANY B | TABLE FORM (TABLA), PLAIN TEXT | What's new →more info (DETAIL) | NEWS RELEASE | COMPANY GUIDE | EMPLOYMENT INFORMATION | CAMPAIGN/ EVENT | ENVIRONMENT MAINTENANCE STRATEGY | NONE | COMMODITY INTRODUCTION | CUSTOMER CONSULTING ROOM | ENGLISH |
| | COMPANY C | TABLE FORM (TABLA), PLAIN TEXT | What's new | NEWS/PRESS RELEASE | COMPANY INFORMATION | EMPLOYMENT INFORMATION | REFRESHMENT/ FOODS→ CAMPAIGN INFORMATION | STRATEGY FOR ENVIRONMENT PROBLEM | SETTLEMENT REPORT | REFRESHMENT/ FOODS | ADDRESS OF OPINION AND INQUIRY AFTER VIEWING THIS HOME PAGE | ENGLISH |
| | COMPANY D | BANNER, TABLE FORM (TABLA) | NEW ARRIVAL INFORMATION | PRESS RELEASE | COMPANY GUIDE | COMPANY GUIDE→ EMPLOYMENT INFORMATION | PRESENT CAMPAIGN | COMPANY GUIDE→ STRATEGY FOR ENVIRONMENT | IR INFORMATION (COMPANY SALES RESULT) | GUIDE TO COMMODITIES AND ADVERTISEMENT | INQUIRY | Global Version (ENGLISH) |
| | COMPANY E | TABLE FORM | ANNOUNCEMENT, 'New' MARK ON EACH ITEM | NEWS RELEASE | COMPANY INFORMATION (COMPANY PROFILE) | COMPANY INFORMATION (TO STUDENTS) | CAMPAIGN | NONE | INVESTOR RELATIONS | COMMODITY INTRODUCTION | COLUMN FOR CUSTOMER→ INQUIRY BY MAIL, CUSTOMER CENTER (Q&A) | English |
| | COMPANY F | TABLE FORM | What's new | LATEST NEWS | COMPANY GUIDE | EMPLOYMENT INFORMATION | | STRATEGY FOR ENVIRONMENT | IR INFORMATION | COMMODITY LIST | INQUIRY Q&A | ENGLISH |
| | COMPANY G | TABLE FORM | NEW ARRIVAL INFORMATION | TOP, PRODUCT INFORMATION, SALES INFORMATION | COMPANY INFORMATION | EMPLOYMENT INFORMATION | CAMPAIGN | NONE | SETTLEMENT INFORMATION | PRODUCTION INFORMATION | NONE | NONE |

| PLANT TOUR | TOP TEXT MESSAGE | SPECIFIC ITEMS BY INDUSTRY ||||| OTHER MENUS |
| --- | --- | --- | --- | --- | --- | --- |
| | | SHOP (INTERNET) | IMAGE CHARACTER | RECIPE | HEALTH | |
| PLANT TOUR GUIDE | SAFETY OF COMMODITIES OF COMPANY A GROUP RELATING TO BSE PROBLEM | SHOPS OF COMPANY A | IMAGE GIRL | COMPANY A-fan.com→LET'S ENJOY FOODS AND LIQUOR→RECIPE | COMPANY A-fan.com→LET'S WALK.COM | ■site map ■my nabi ■LINK TO INTRA-GROUP COMPANY(EACH ITEM) ■OPINION/INQUIRY ■RESTAURANT SITE ■MonthlyAccessRanking ■CAMPAIGN AGAINST RAISE OF TAX |
| PLANT GUIDE | SAFETY OF OUR PRODUCTS RELATING TO BSE PROBLEM | ON-LINE SHOP | NONE | GOURMET GUIDE→GOURMET RECIPE | GOOD-DAY HEALTHY FOODS, HOW TO GO WELL WITH LIQUOR | ■ON AIR RECOMMENDED SITE·WhiskyWeb·WEB NIGHT BAR·FLOWERS AND TALKS·e-wine·CLUB MALTS·SQUARE FOR ALL·LET'S DRINK SHOCHU!·DIGITAL PRESENT■ COMPANY B GROUP ■MOBILE PHONE ■CM ■TOPICS ON LIQUOR ■ART, CULTURE, SPORTS(EACH SITE) |
| NONE | SAFETY OF OUR PRODUCTS CONTAINING BEEF | SHOPPING CORNER | REFRESHMENT/ FOODS→ ○○VILLAGE | NONE | USEFUL HEALTH INFORMATION | ■SPORTS FOODS ■INFORMATION ABOUT CHOCOLATE ■NEW MATERIAL BUSINESS ■PHARMACEUTICAL BUSINESS OF COMPANY C ■AGRICULTURAL MATERIAL ■MUSHROOM BUSINESS |
| NONE | 2001/10/17 INFORMATION ABOUT CONFIRMATION OF SAFETY OF PRODUCTS CONTAINING BEEF | ONLINE SHOPPING | COMMODITIES AND ADVERTI-SEMENT | RECIPE ENCYCLOPEDIA 6000 MENUS | ALL ABOUT AMINO ACID | ■SITE MAP ■IMPACT ■PRIVACY POLICY ■ GlobalVersion ■AMINOVITAL SITE ■ON LINE SHOPPING ■RECIPE ENCYCLOPEDIA |
| PLANT TOUR GUIDE | BSE RELATED INFORMATION | NONE | NONE | COOKING RECIPE | FOODS AND HEALTH→HEALTHY LIFE LAB, ·MBP ·BodyNavi ·VEGETABLE SHOP·SNOW MAGAZINE | ■CHEESE CLUB OF COMPANY E ■FOODS AND HEALTH ■COOKING RECIPE ■HOME DELIVERY OF MILK ■ EACH INDIVIDUAL SITE |
| PLANT TOUR GUIDE | SAFETY OF OUR PRODUCTS RELATING TO BSE | HEALTHY FOOD SHOP OF COMPANY F | Hi Line TSUYARI GROUP | NONE | COMPANY F, IT'S A PROBIOTEX HEALTHY METHOD | ■COSMETICS ■MEDICINE FOR INTESTINAL DISORDERS OF COMPANY F ■Links ■SITE MAP HEALTHY FOOD SHOP OF COMPANY F ■INDIVIDUAL SITE |
| STARTING TOUR IN BREAD PLANT, DELIVERY OF BREAD (THROUGH NETWORK) | SAFETY OF OUR PRODUCTS RELATING TO BSE PROBLEM | SHOP/GIFT SELECTION OF COMPANY G | PRODUCT INFORMATION →ROLLED SANDWICH→ SUSIE | RECIPE OF BREAD | NONE | ■STORE INFORMATION ■WORLD OF BREAD |

| COSMETIC MANUFACTURER | | NEW ARRIVALS | RELEASE | COMPANY PROFILE | EMPLOYMENT | CAMPAIGN | ENVIRONMENT | SALES RESULT | COMMODITIES | INQUIRY | INFORMATION IN FOREIGN LANGUAGE |
|---|---|---|---|---|---|---|---|---|---|---|---|
| COMPANY H | TABLE FORM. POPUP MENU | NEW ARRIVAL INFORMATION | NEW COMMODITIES OF THIS MONTH | CORPORATE ACTIVITIES | CORPORATE ACTIVITIES (EMPLOYMENT INFORMATION) | | CORPORATE INFORMATION (STRATEGY FOR ENVIRONMENT) | CORPORATE ACTIVITIES (FINANCIAL/ IR INFORMATION) | ABOUT COMMODITIES. COMMODITY RETRIEVAL COMMODITY ADVICE COUNTER | | Global Sites (·English ·French ·German ·Italian ·Spanish ·Portuguese ·Trad. Mandarin) |
| COMPANY I | TABLE FORM | NEW ARRIVAL INFORMATION | IR INFORMATION →NEWS RELEASE | IR INFORMATION (COMPANY GUIDE) | EMPLOYMENT INFORMATION | web COMPANY I→AUTUMN BEAUTY CAMPAIGN | | IR INFORMATION | COMMODITY GUIDE | INQUIRY | ENGLISH version is here |
| COMPANY J | FRAME | NEW ARRIVAL INFORMATION | | CORPORATION INFORMATION | EMPLOYMENT INFORMATION | EVENT GUIDE | CORPORATE INFORMATION (ENVIRONMENT REPORT) | IR INFORMATION. Annual Report | Select a Band | CORPORATE INFORMATION (CUSTOMER CONSULTATION ROOM) | ENGLISH |
| COMPANY L | TABLE FORM | What'sNew! | NEWS RELEASE | COMPANY GUIDE | EMPLOYMENT INFORMATION | PRODUCTS AND CAMPAIGN | STRATEGY FOR ENVIRONMENT | INVESTOR INFORMATION | INDUSTRIAL CHEMICAL PRODUCTS. INDUSTRIAL PRODUCTS. PRODUCT GUIDE | COMPANY L PRODUCT CONSULTING ROOM | ENGLISH |

| BEAUTY | FASHION | COUNSELING | DISPLAY OF INGREDIENT OF COSMETICS | | | | |
|---|---|---|---|---|---|---|---|
| ■BEAUTY AND FASHION ■TO LIVE A BEAUTIFUL LIFE ■BEAUTY COMMUNICATIONS | BEAUTY AND FASHION | SKIN VISIOM | CORPORATE INFORMATION→ DISPLAY OF ALL INGREDIENTS OF COSMETICS | | | | ■CULTURAL ACTIVITIES ■SITE RETRIEVAL ■+W+M MEMBER ■MAIL DISTRIBUTION ■WEATHER AND UV FORECAST ■I MODE, j SKY ■INTERNET SHOP ■GROUP SITE OF COMPANY H |
| BEAUTY INFORMATION | | web COMPANY I→BEAUTY INFO | web COMPANY I→ COSMETICS Q&A→ DISPLAY AND INGREDIENT OF COSMETICS | | | | ■RELEVANT BUSINESS ■RESTAURANT ■web COMPANY I |
| BEAUTY INFORMATION | CLUB J→ ClubLips (MEMBERSHIP) | BEAUTE de J →COUNSELING | CORPORATE INFORMATION→ CUSTOMER COUNSELING ROOM→ BRIEF EXPLANATION OF DISPLAY OF ALL INGREDIENTS | | | | ■SITE MAP ■SITE FOR MOBILE PHONE |
| BEAUTY/HEALTH/ LIVING INFORMATION | | SkinCare→ SKIN CARE COURSE | DISPLAY INFORMATION OF ALL INGREDIENTS OF COSMETICS | | | | ■LIVING AND CULTURAL STUDY ■SITE MAP |

F I G. 2 3

| AUTOMOBILE MANUFACTURER | | NEW ARRIVALS | RELEASE | COMPANY PROFILE | EMPLOYMENT | CAMPAIGN | ENVIRONMENT | SALES RESULT | COMMODITIES | INQUIRY | INFORMATION IN FOREIGN LANGUAGE |
|---|---|---|---|---|---|---|---|---|---|---|---|
| COMPANY M | TABLE FORM | News | TOPICS | CORPORATE INFORMATION | EMPLOYMENT INFORMATION | PRESENT INFORMATION | STRATEGY FOR ENVIRONMENT | INFORMATION FOR INVESTORS | SHOWROOM | INQUIRY | ENGLISH |
| COMPANY N | TABLE FORM <Layer> | Hot News | PUBLIC RELATIONS (Press Room) | COMPANY GUIDE(Guide to COMPANY N) | JOB INFORMATION (Jobs) | HOW TO USE THIS SITE→ PRESENT INFORMATION | ENVIRONMENT (Environment) | TO INVESTORS (Investors) | Automobiles, Motorcycles, Power-Products | CUSTOMER CONSULTING CENTER (Customer) | COMPANY N Worldwide site |
| COMPANY O | FRAME | NEWS OF COMPANY O | NEWS OF COMPANY O→ NEW CAR INFORMATION | CORPORATE INFORMATION | CORPORATE INFORMATION →EMPLOYMENT INFORMATION OF COMPANY O | NEWS OF COMPANY O→ CAMPAIGN INFORMATION | CORPORATE INFORMATION→ STRATEGY FOR ENVIRONMENT | CORPORATE INFORMATION→ Annual Report (English) | CAR LINEUP CARVIEW | SITE GUIDE→ INQUIRY | CORPORATE INFORMATION AND LINK TO OVERSEAS |
| COMPANY P | TABLE FORM | CAR NEWS OF COMPANY P | CAR NEWS OF COMPANY P→ NEW CAR NEWS | CORPORATE INFORMATION | CORPORATE INFORMATION →EMPLOYMENT INFORMATION | NEWS OF COMPANY P→ EVENT NEWS | CORPORATE INFORMATION→ STRATEGY FOR ENVIRONMENT | CORPORATE INFORMATION→ TO INVESTORS | VEHICLES, SMALL CARS, TRUCKS, BUSES, USED CARS | SUPPORT FOR CUSTOMERS | ENGLISH, Corporate News, Worldwide Distributors |

FIG. 24

| PLANT TOUR | RECALL | SAFETY | USED CARS | RENTAL | PURCHASE SUPPORT | DEALER | MOTOR SHOW (EVENT) | |
|---|---|---|---|---|---|---|---|---|
| PLANT TOUR | CAR LIFE (RECALL INFORMATION) | CORPORATE INFORMATION →STRATEGY FOR SAFETY | PURCHASE OF CARS/ U-Car (USED CARS) | RENTAL (RESERVATION/ ESTIMATION) | PURCHASE SUPPORT | SHOPS OF COMPANY M | MOTOR SPORTS NEWS, EVENT INFORMATION | ■CAR LIFE ■COMPANY M OTHER THAN CARS ■GAZOO ■PAVILION OF COMPANY M ■REGISTRATION IN MAIL MAGAZINE ■SITE MAP ■INFORMATION BEFORE USING |
| PLANT TOUR (Kengaku) | INFORMATION ABOUT RECALL IMPROVEMENT PLAN, ETC. | SAFETY | Automobiles (USED CAR STOCK RETRIEVAL) | Automobiles→ EXCLUSIVE RESERVATION FOR CAR RENTAL OF COMPANY N | NEGOTIATION SUPPORT (GENERAL PURPOSE PRODUCTS ONLY) | Automobiles → Dealer Locator | MotorSports, Motor Show | ■SiteMap ■i-mode ■Technology ■GROUP OF COMPANY N ■MESSAGE OF COMPANY N ■FAN SITE OF COMPANY N ■HISTORY OF COMPANY N ■FACILITY INFORMATION ■SOCIAL ACTIVITIES ■MAIL SERVICE OF COMPANY N ■web SERVICE OF COMPANY N ■TVCM ■PRESENTED PROGRAM ■HOW TO USE THIS SITE ■FAQ ■Feedback ■Search |
| EVENT/ FACILITIES→ PLANT TOUR | RECALL INFORMATION | | USED CAR RETRIEVAL | CAR LIFE SUPPORT→ CAR RENTAL COMPANY O | PURCHASE SUPPORT, ESTIMATION | GUIDE TO SHOPS OF COMPANY O | EVENT/ FACILITIES→ COMPANY O GALLERY | ■CAR LIFE SUPPORT ■ENTERTAINMENT ■SITE GUIDE ■PASSPORT MEMBER REGISTRATION/CHANGE ■REQUEST FOR CATALOG ■GUIDE TO SHOPS OF COMPANY O ■RETRIEVAL FOR TRIAL DRIVING |
| NONE | CUSTOMER SUPPORT→ RECALL INFORMATION | QUALITY OF 'SAFETY' TO SMALL CARS→ CUSTOMER SUPPORT→ SAFE DRIVING COURSE? | USED CARS | VEHICLES/ SMALL CARS →SEARCH FOR CAR→ SEARCH ON CONDITION | VARIOUS APPLICATIONS | GUIDE TO DEALERS | MOTOR SPORTS, 35TH TOKYO MOTOR SHOW 2001 | ■FREE CALL ■SITE INDEX ■LINK LIST |

F I G. 2 5

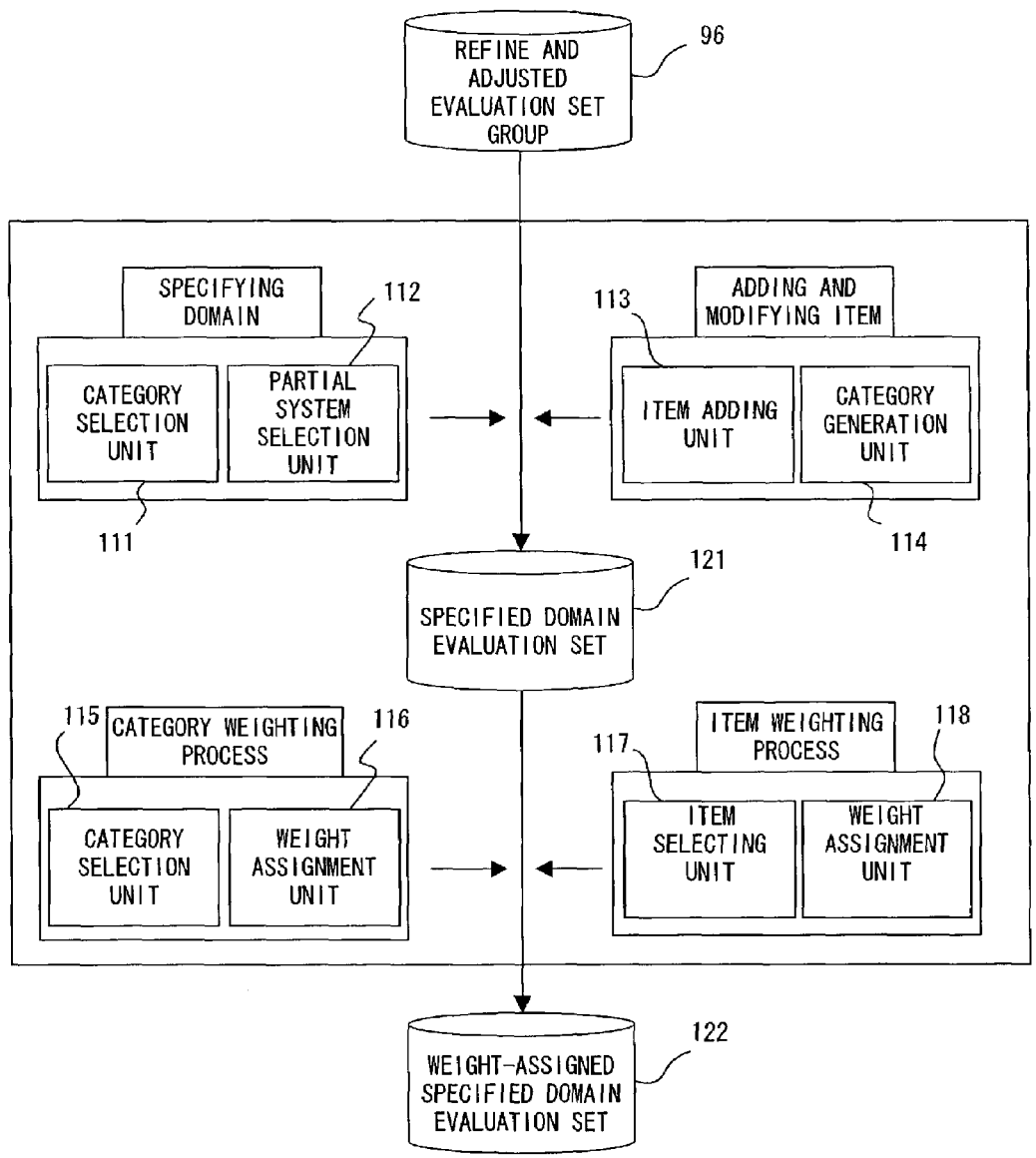
F I G. 2 6

| FOOD MANU-FACTURER | ENTER-PRISE NAME | WEIGHT OF CATEGORY | top STRUCTURE | NEW ARRIVALS | RELEASE | COMPANY PROFILE | EMPLOYMENT | REPRESENTATION OF COMMON top MENU | | | | | | |
|---|---|---|---|---|---|---|---|---|---|---|---|---|---|---|
| | | | | | | | | CAMPAIGN | ENVIRONMENT | SALES RESULT | COMMODITIES | INQUIRY | INFORMATION IN FOREIGN LANGUAGE | |
| WEIGHT OF ITEM | | | | 10 | 10 | 10 | 10 | 9 | 8 | 6 | 8 | 10 | 2 | |
| | COMPANY A | 10 | BANNER DATA, TABLE FORM (TABLA), PLAIN TEXT | What's new →more info (DETAIL) | | CORPORATE INFORMATION | CORPORATE INFORMATION | EVENT/ CAMPAIGN INFOR-MATION | ENVIRONMENT/ MECENAT | IR INFORMATION | COMMODITY LIST | OPINION/ INQUIRY | English, Chinese | |
| | COMPANY B | 10 | TABLE FORM (TABLA), PLAIN TEXT | What's new →more info (DETAIL) | NEWS RELEASE | COMPANY GUIDE | EMPLOYMENT INFORMATION | CAMPAIGN/ EVENT | ENVIRONMENT MAINTENANCE STRATEGY | NONE | COMMODITY INTRODUCTION | CUSTOMER CONSULTING ROOM | ENGLISH | |
| | COMPANY C | 9 | TABLE FORM (TABLA), PLAIN TEXT | What's new | NEWS/ PRESS RELEASE | COMPANY INFORMATION | EMPLOYMENT INFORMATION | REFRESH-MENT/ FOODS→ CAMPAIGN INFOR-MATION | STRATEGY FOR ENVIRONMENT PROBLEM | SETTLEMENT REPORT | REFRESHMENT/ FOODS | ADDRESS OF OPINION AND INQUIRY AFTER VIEWING THIS HOME PAGE | ENGLISH | |
| | COMPANY D | 8 | BANNER, TABLE FORM (TABLA) | NEW ARRIVAL INFORMATION | PRESS RELEASE | COMPANY GUIDE | COMPANY GUIDE→ EMPLOYMENT INFORMATION | PRESENT CAMPAIGN | COMPANY GUIDE→ STRATEGY FOR ENVIRONMENT | IR INFORMATION (COMPANY SALES RESULT) | GUIDE TO COMMODITIES AND ADVER-TISEMENT | INQUIRY | Global Version (ENGLISH) | |
| | COMPANY E | 7 | TABLE FORM | ANNOUNCE-MENT, 'New' MARK ON EACH ITEM | NEWS RELEASE | COMPANY INFORMATION (COMPANY PROFILE) | COMPANY INFORMATION (TO STUDENTS) | CAMPAIGN | NONE | INVESTOR RELATIONS | COMMODITY INTRO-DUCTION | COLUMN FOR CUSTOMER→ INQUIRY BY MAIL, CUSTOMER CENTER (Q&A) | English | |
| | COMPANY F | 7 | TABLE FORM | What's new | LATEST NEWS | COMPANY GUIDE | EMPLOYMENT INFORMATION | | STRATEGY FOR ENVIRONMENT | IR INFORMATION | COMMODITY LIST | INQUIRY/ Q&A | ENGLISH | |
| | COMPANY G | 5 | TABLE FORM | NEW ARRIVAL INFORMATION | TOP, PRODUCT INFORMATION, SALES INFORMATION | COMPANY INFORMATION | EMPLOYMENT INFORMATION | CAMPAIGN | NONE | SETTLEMENT INFORMATION | PRODUCTION INFORMATION | NONE | NONE | |

FIG. 27

| | | SPECIFIC ITEMS BY INDUSTRY | | | | |
|---|---|---|---|---|---|---|
| PLANT TOUR | top TEXT MESSAGE | SHOP (INTERNET) | IMAGE CHARACTER | RECIPE | HEALTH | OTHER MENUS |
| PLANT TOUR GUIDE | SAFETY OF COMMODITIES OF COMPANY A GROUP RELATING TO BSE PROBLEM | SHOPS OF COMPANY A | IMAGE GIRL | COMPANY A-fan.com→LET'S ENJOY FOODS AND LIQUOR→RECIPE | COMPANY A-fan.com→LET'S WALK.COM | ■site map ■my nabi ■LINK TO INTRA-GROUP COMPANY(EACH ITEM) ■OPINION/INQUIRY ■RESTAURANT SITE ■MonthlyAccessRanking ■CAMPAIGN AGAINST RAISE OF TAX |
| PLANT GUIDE | SAFETY OF OUR PRODUCTS RELATING TO BSE PROBLEM | ON-LINE SHOP | NONE | GOURMET GUIDE→ GOURMET RECIPE | GOOD-DAY HEALTHY FOODS, HOW TO GO WELL WITH LIQUOR | ■ON AIR RECOMMENDED SITE·WhiskyWeb·WEB NIGHT BAR·FLOWERS AND TALKS·e-wine·CLUB MALTS·SQUARE FOR ALL·LET'S DRINK SHOCHU·DIGITAL PRESENT ■ COMPANY B GROUP ■MOBILE PHONE ■CM ■TOPICS ON LIQUOR ■ART, CULTURE, SPORTS(EACH SITE) |
| NONE | SAFETY OF OUR PRODUCTS CONTAINING BEEF | SHOPPING CORNER | REFRESHMENT/ FOODS→ ○OVILLAGE | NONE | USEFUL HEALTH INFORMATION | ■SPORTS FOODS ■INFORMATION ABOUT CHOCOLATE ■ NEW MATERIAL BUSINESS ■PHARMACEUTICAL BUSINESS OF COMPANY G ■AGRICULTURAL MATERIAL ■MUSHROOM BUSINESS |
| NONE | 2001/10/17 INFORMATION ABOUT CONFIRMATION OF SAFETY OF PRODUCTS CONTAINING BEEF | ONLINE SHOPPING | COMMODITIES AND ADVER-TISEMENT | RECIPE ENCYCLOPEDIA 6000 MENUS | ALL ABOUT AMINO ACID | ■SITE MAP ■IMPACT ■PRIVACY POLICY ■ GlobalVersion ■AMINOVITAL SITE ■ON LINE SHOPPING ■RECIPE ENCYCLOPEDIA |
| PLANT TOUR GUIDE | BSE RELATED INFORMATION | NONE | NONE | COOKING RECIPE | FOODS AND HEALTH→HEALTHY LIFE LAB, ·MBP ·BodyNavi ·VEGETABLE SHOP ·SNOW MAGAZINE | ■CHEESE CLUB OF COMPANY E ■FOODS AND HEALTH ■COOKING RECIPE ■HOME DELIVERY OF MILK ■EACH INDIVIDUAL SITE |
| PLANT TOUR GUIDE | SAFETY OF PRODUCTS RELATING TO BSE | HEALTHY FOOD SHOP OF COMPANY F | Hi Line TSUYARI GROUP | NONE | COMPANY F, IT'S A PROBIOTEX HEALTHY METHOD | ■COSMETICS ■MEDICINE FOR INTESTINAL DISORDERS OF COMPANY F ■Links ■SITE MAP ■HEALTHY FOOD SHOP OF COMPANY F ■INDIVIDUAL SITE |
| STARTING TOUR IN BREAD PLANT, DELIVERY OF BREAD (THROUGH NETWORK) | SAFETY OF OUR PRODUCTS RELATING TO BSE PROBLEM | SHOP/GIFT SELECTION OF COMPANY G | PRODUCT INFORMATION →ROLLED SANDWICH→ SUSIE | RECIPE OF BREAD | NONE | ■STORE INFORMATION ■WORLD OF BREAD |

FIG. 28

| COSMETIC MANUFACTURE | ORGANIZATION NAME | WEIGHT OF CATEGORY | NEW ARRIVALS | RELEASE | COMPANY PROFILE | EMPLOYMENT | CAMPAIGN | ENVIRONMENT | SALES RESULT | COMMODITIES | INQUIRY | INFORMATION IN FOREIGN LANGUAGE |
|---|---|---|---|---|---|---|---|---|---|---|---|---|
| | WEIGHT OF ITEM | | 10 | 10 | 10 | 10 | 9 | 8 | 6 | 8 | 10 | 2 |
| | COMPANY H | 10 TABLE FORM, POPUP MENU | NEW ARRIVAL INFORMATION | NEW COMMODITIES OF THIS MONTH | CORPORATE ACTIVITIES | CORPORATE ACTIVITIES (EMPLOYMENT INFORMATION) | | CORPORATE INFORMATION (STRATEGY FOR ENVIRONMENT) | CORPORATE ACTIVITIES (FINANCIAL/ IR INFORMATION) | ABOUT COMMODITIES, COMMODITY RETRIEVAL COMMODITY ADVICE COUNTER | INQUIRY | GlobalSites (·English ·French ·German ·Italian ·Spanish ·Portu-guese ·Trad Mandarin) |
| | COMPANY I | 10 TABLE FORM | NEW ARRIVAL INFORMATION | IR INFORMATION →NEWS RELEASE | IR INFORMATION (COMPANY GUIDE) | EMPLOYMENT INFORMATION | web COMPANY I →AUTUMN BEAUTY CAMPAIGN | | IR INFORMATION | COMMODITY GUIDE | INQUIRY | English version is here |
| | COMPANY J | 9 FRAME | NEW ARRIVAL INFORMATION | | CORPORATE INFORMATION | EMPLOYMENT INFORMATION | EVENT GUIDE | CORPORATE INFORMATION (ENVIRONMENT REPORT) | IR INFORMATION, Annual Report | Select a Brand | CORPORATE INFORMATION (CUSTOMER CONSUL-TATION ROOM) | ENGLISH |
| | COMPANY L | 8 TABLE FORM | What's new | NEWS RELEASE | COMPANY GUIDE | EMPLOYMENT INFORMATION | PRODUCTS AND CAMPAIGN | STRATEGY FOR ENVIRONMENT | INVESTORS INFORMATION | INDUSTRIAL CHEMICAL PRODUCTS, INDUSTRIAL PRODUCTS, PRODUCT GUIDE | COMPANY L PRDUCT CONSULTING ROOM | ENGLISH |

FIG. 29

| BEAUTY | FASHION | COUNSELING | DISPLAY OF INGREDIENT OF COSMETICS | | | |
|---|---|---|---|---|---|---|
| 8 | 3 | 6 | 7 | | | |
| ■BEAUTY AND FASHION ■TO LIVE A BEAUTIFUL LIFE ■BEAUTY COMMUNICATIONS | BEAUTY AND FASHION | SKIN VISION | CORPORATE INFORMATION→ DISPLAY OF ALL INGREDIENTS OF COSMETICS | | | ■CULTURAL ACTIVITIES ■SITE RETRIEVAL ■+W+M MEMBER ■MAIL DISTRIBUTION ■WEATHER AND UV FORECAST ■I MODE, j SKY ■INTERNET SHOP ■GROUP SITE OF COMPANY H |
| BEAUTY INFORMATION | | web COMPANY I→BEAUTY INFO | web COMPANY I→ COSMETIC Q&A→ DISPLAY AND INGREDIENT OF COSMETICS | | | ■RELEVANT BUSINESS ■RESTAURANT ■web COMPANY I |
| BEAUTY INFORMATION | CLUB J→ClubLips (MEMBERSHIP) | BEAUTEde J→ COUNSELING | CORPORATE INFORMATION→ CUSTOMER COUNSELING ROOM →BRIEF EXPLANATION OF DISPLAY OF ALL INGREDIENTS | | | ■SITE MAP ■SIT FOR MOBILE PHONE |
| BEAUTY/ HEALTH/LIVING INFORMATION | | SkinCare→ SKIN CARE COURSE | DISPLAY INFORMATION OF ALL INGREDIENTS OF COSMETICS | | | ■LIVING AND CULTURAL STUDY ■SITE MAP |

F I G. 3 0

| AUTOMOBILE MANU-FACTURER | WEIGHT OF CATEGORY | | NEW ARRIVALS | RELEASE | COMPANY PROFILE | EMPLOYMENT | CAMPAIGN | ENVIRONMENT | SALES RESULT | COMMODITIES | INQUIRY | INFORMATION IN FOREIGN LANGUAGE |
|---|---|---|---|---|---|---|---|---|---|---|---|---|
| WEIGHT OF ITEM | | | 10 | 10 | 10 | 10 | 9 | 8 | 6 | 8 | 10 | 2 |
| COMPANY M | 10 | TABLE FORM | News | TOPICS | CORPORATE INFORMATION | EMPLOYMENT INFORMATION | PRESENT INFORMATION | STRATEGY FOR ENVIRONMENT | INFORMATION FOR INVESTORS | SHOWROOM | INQUIRY | ENGLISH |
| COMPANY N | 10 | TABLE FORM <Layer> | Hot News | PUBLIC RELATIONS (PressRoom) | COMPANY GUIDE (Guido to Company N) | JOB INFORMATION (Jobs) | HOW TO USE THIS SITE→ PRESENT INFORMATION | ENVIRONMENT (Environment) | TO INVESTORS (Investors) | Automobiles. Motorcycles. PowerProducts | CUSTOMER CONSULTING CENTER (Customer) | COMPANY N Worldwide site |
| COMPANY O | 10 | FRAME | NEWS OF COMPANY O | NEWS OF COMPANY O→ NEW CAR INFORMATION | CORPORATE INFORMATION | CORPORATE INFORMATION →EMPLOYMENT INFORMATION OF COMPANY O | NEWS OF COMPANY O→ CAMPAIGN INFORMATION | CORPORATE INFORMATION→ STRATEGY FOR ENVIRONMENT | CORPORATE INFORMATION→ AnnualReport (ENGLISH) | CAR LINEUP. CARVIEW | SITE GUIDE →INQUIRY | CORPORATE INFORMATION AND LINK TO OVERSEAS |
| COMPANY P | 10 | TABLE FORM | NEWS OF COMPANY P | CAR NEWS OF COMPANY P→ NEW CAR NEWS | CORPORATE INFORMATION | CORPORATE INFORMATION →EMPLOYMENT INFORMATION | NEWS OF COMPANY P→ EVENT NEWS | CORPORATE INFORMATION→ STRATEGY FOR ENVIRONMENT | CORPORATE INFORMATION→ TO INVESTORS | VEHICLES. SMALL CARS. TRUCKS. BUSES. USED CARS | SUPPORT FOR CUSTOMERS | ENGLISH. Corporates News Worldwide Distributors |

FIG. 31

| PLANT TOUR | RECALL | SAFETY | USED CARS | RENTAL | PURCHASE SUPPORT | DEALERS | MOTOR SHOW (EVENT) | |
|---|---|---|---|---|---|---|---|---|
| | 3 | 8 | 7 | 7 | 5 | | 6 | 4 |
| PLANT TOUR | CAR LIFE (RECALL INFORMATION) | CORPORATE INFORMATION →STRATEGY FOR SAFETY | PURCHASE OF CARS/ U-Car (USED CARS) | RENTAL (RESERVATION/ ESTIMATION) | PURCHASE SUPPORT | SHOPS OF COMPANY N | MOTOR SPORTS NEWS, EVENT INFORMATION | ■CAR LIFE ■COMPANY M OTHER THAN CARS ■GAZOO ■PAVILION OF COMPANY M ■REGISTRATION IN MAIL MAGAZINE ■SITE MAP ■INFORMATION BEFORE USING |
| PLANT TOUR (Kengaku) | INFORMATION ABOUT RECALL IMPROVEMENT PLAN, ETC. | SAFETY | Automobiles (USED CAR STOCK RETRIEVAL) | Automobiles →EXCLUSIVE RESERVATION FOR CAR RENTAL OF COMPANY N | NEGO- TIATION SUPPORT (GENERAL PURPOSE PRODUCTS ONLY) | Auto- mobiles ↓ Dealer Locator | Motor Sports MOTOR SHOW | ■SiteMap ■i-mode ■Technology ■GROUP OF COMPANY N ■MESSAGE OF COMPANY N ■FAN SITE OF COMPANY N ■HISTORY OF COMPANY N ■FACILITY INFORMATION ■SOCIAL ACTIVITIES ■MAIL SERVICE OF COMPANY N ■web SERVICE OF COMPANY N ■TVCM ■PRESENTED PROGRAM ■HOW TO USE THIS SITE ■FAQ ■Feedback ■Search |
| EVENT/ FACILITIES→ PLANT TOUR | RECALL INFORMATION | | USED CAR RETRIEVAL | CAR LIFE SUPPORT→CAR RENTAL COMPANY O | PURCHASE SUPPORT, ESTI- MATION | GUIDE TO SHOPS OF COMPANY O | EVENT/ FACILI- TIES→ COMPANY O GALLERY | ■CAR LIFE SUPPORT ■ENTERTAINMENT ■SITE GUIDE ■PASSPORT MEMBER CHANGE REGISTRATION/CHANGE ■REQUEST FOR CATALOG ■GUIDE TO SHOPS OF COMPANY O ■RETRIEVAL FOR TRIAL DRIVING |
| NONE | CUSTOMER SUPPORT, RECALL INFORMATION | QUALITY OF 'SAFETY' TO SMALL CARS, CUSTOMER SUPPORT→ SAFE DRIVING COURSE | USED CARS | VEHICLES/ SMALL CARS→ SEARCH FOR CAR→SEARCH ON CONDITION | VARIOUS APPLI- CATIONS | GUIDE TO DEALERS | MOTOR SPORTS, 35TH TOKYO MOTOR SHOW 2001 | ■FREE CALL ■SITE INDEX ■LINK LIST |

FIG. 32

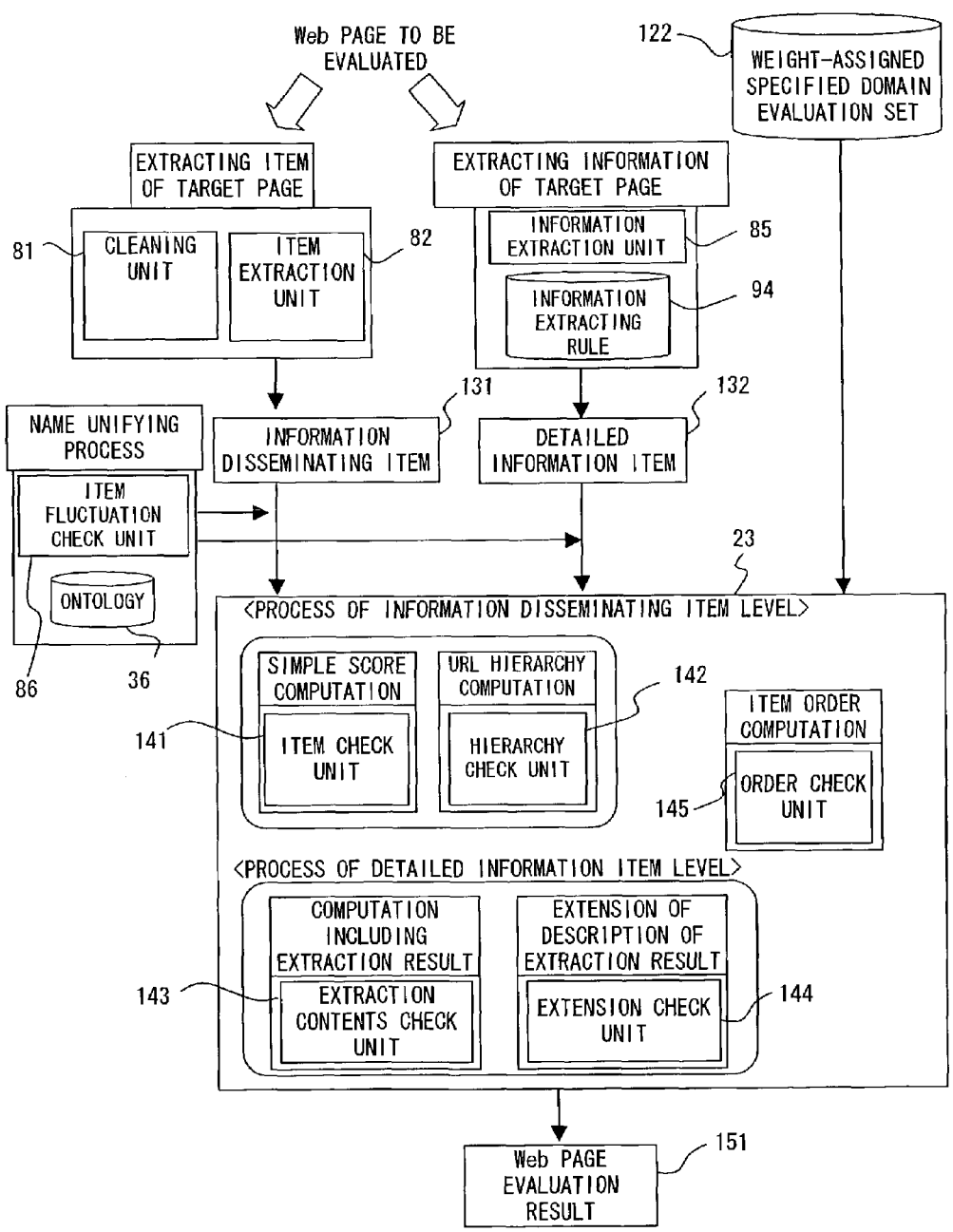
F I G. 33

| FOOD MANU-FACTURER | ENTERPRISE NAME | url | REPRESENTATION OF COMMON top MENU | | | | | | | | | | | | | |
|---|---|---|---|---|---|---|---|---|---|---|---|---|---|---|---|---|
| | | | NEW ARRIVALS | RELEASE | COMPANY PROFILE | EMPLOY-MENT | CAMPAIGN | ENVIRON-MENT | SALES RESULT | COMMODITIES | INQUIRY | INFORMATION IN FOREIGN LANGUAGE | SITE MAP | MAIL MAGAZINE | web MAGAZINE | MOBILE |
| COMPANY A | | URL OF COMPANY A | 1 | 1 | 1 | 1 | 1 | 0 | 1 | 1 | 1 | 0 | 1 | 0 | 0 | 0 |
| COMPANY B | | URL OF COMPANY B | 1 | 1 | 1 | 1 | 1 | 1 | 1 | 1 | 1 | 1 | 1 | 0 | 0 | 1 |
| COMPANY C | | URL OF COMPANY C | 1 | 1 | 1 | 1 | 1 | 1 | 1 | 1 | 1 | 1 | 1 | 1 | 1 | 0 |
| COMPANY D | | URL OF COMPANY D | 1 | 1 | 1 | 1 | 0 | 1 | 1 | 1 | 1 | 0 | 1 | 0 | 1 | 0 |
| COMPANY E | | URL OF COMPANY E | 1 | 1 | 1 | 0 | 1 | 0 | 0 | 1 | 0 | 1 | 0 | 0 | 0 | 0 |
| COMPANY F | | URL OF COMPANY F | 1 | 1 | 1 | 1 | 1 | 1 | 1 | 1 | 1 | 1 | 1 | 0 | 0 | 0 |
| COMPANY G | | URL OF COMPANY G | 1 | 1 | 1 | 1 | 1 | 1 | 1 | 1 | 0 | 0 | 1 | 0 | 0 | 0 |
| COMPANY H | | URL OF COMPANY H | 1 | 1 | 1 | 1 | 1 | 1 | 1 | 1 | 1 | 1 | 1 | 0 | 0 | 1 |
| COMPANY I | | URL OF COMPANY I | 1 | 1 | 1 | 1 | 1 | 1 | 1 | 1 | 1 | 0 | 1 | 0 | 0 | 0 |
| COMPANY J | | URL OF COMPANY J | 1 | 1 | 1 | 1 | 1 | 1 | 1 | 1 | 0 | 0 | 0 | 1 | 1 | 0 |
| COMPANY L | | URL OF COMPANY L | 1 | 0 | 1 | 1 | 0 | 1 | 1 | 1 | 0 | 0 | 0 | 0 | 0 | 0 |
| COMPANY M | | URL OF COMPANY M | 1 | 1 | 1 | 1 | 1 | 1 | 1 | 1 | 1 | 0 | 1 | 1 | 0 | 0 |
| COMPANY N | | URL OF COMPANY N | 1 | 1 | 1 | 1 | 1 | 1 | 1 | 1 | 1 | 0 | 1 | 1 | 1 | 1 |
| COMPANY O | | URL OF COMPANY O | 1 | 0 | 1 | 1 | 0 | 0 | 1 | 1 | 1 | 0 | 0 | 0 | 0 | 0 |
| COMPANY P | | URL OF COMPANY P | 1 | 1 | 1 | 1 | 1 | 1 | 0 | 1 | 1 | 1 | 1 | 0 | 0 | 0 |

F I G. 3 4

| PLANT TOUR | top TEXT MESSAGE | SHOP (INTERNET) | IMAGE CHARACTER | RECIPE | HEALTH | VIRTUAL WORLD | CM | OTHER MENUS |
|---|---|---|---|---|---|---|---|---|
| | | | SPECIFIC ITEMS BY INDUSTRY | | | | | |
| 1 | 1 | 1 | 1 | 0 | 1 | 0 | 1 | |
| 1 | 0 | 1 | 1 | 1 | 1 | 1 | 1 | ·UNIVERSITY OF COMPANY A (VIRTUAL WORLD) |
| 0 | 0 | 1 | 0 | 1 | 1 | 1 | 1 | ·SOY BEAN SAUCE MUSEUM |
| 1 | 0 | 1 | 1 | 1 | 1 | 0 | 1 | ·CARE SUPPORT GROUP |
| 1 | 1 | 0 | 1 | 1 | 0 | 1 | 1 | |
| 0 | 1 | 1 | 1 | 1 | 1 | 0 | 1 | ·CM INFORMATION |
| 1 | 1 | 1 | 1 | 1 | 1 | 1 | 1 | ·CM INTRODUCTION, VIRTUAL PLANT |
| 1 | 0 | 1 | 1 | 1 | 1 | 1 | 1 | ·FAN CLUB OF X (VIRTUAL WORLD) |
| 0 | 0 | 1 | 0 | 1 | 1 | 1 | 1 | ·ABC KINGDOM, CM INTRODUCTION |
| 0 | 0 | 1 | 1 | 1 | 1 | 0 | 1 | ·TV-CM |
| 0 | 1 | 0 | 0 | 0 | 0 | 0 | 1 | ·GOOD AND OLD ADVERTISEMENTS |
| 0 | 1 | 1 | 0 | 1 | 1 | 1 | 1 | ·GOURMET WORLD PAVILION |
| 0 | 1 | 0 | 1 | 0 | 0 | 1 | 1 | ·CM INFORMATION, ○○ THEATER |
| 0 | 1 | 1 | 0 | 0 | 0 | 0 | 0 | |
| 0 | 1 | 1 | 0 | 1 | 0 | 1 | 1 | ·JAPANESE LIQUOR LIBRARY |

FIG. 35

| ENTERPRISE NAME | ENTERPRISE NAME | CAPITAL | PRESIDENT NAME | ADDRESS | POSTAL CODE | Tel | Fax | NUMBER OF EMPLOYEES | MAP | SETTLEMENT | STOCK PRICE |
|---|---|---|---|---|---|---|---|---|---|---|---|
| COMPANY A | 1 | 1 | 1 | 1 | 1 | 1 | 0 | 1 | 0 | 1 | 0 |
| COMPANY B | 1 | 1 | 1 | 1 | 1 | 0 | 0 | 1 | 0 | 1 | 0 |
| COMPANY C | 1 | 1 | 1 | 1 | 1 | 1 | 0 | 1 | 0 | 0 | 0 |
| COMPANY D | 1 | 1 | 1 | 1 | 1 | 1 | 0 | 1 | 0 | 0 | 0 |
| COMPANY E | 1 | 1 | 1 | 1 | 1 | 1 | 0 | 1 | 0 | 1 | 0 |
| COMPANY F | 1 | 1 | 1 | 1 | 1 | 1 | 0 | 1 | 1 | 1 | 1 |
| COMPANY G | 1 | 1 | 1 | 1 | 1 | 0 | 0 | 0 | 1 | 0 | 0 |
| COMPANY H | 1 | 1 | 1 | 1 | 1 | 1 | 0 | 1 | 0 | 1 | 0 |
| COMPANY I | 1 | 1 | 1 | 0 | 0 | 0 | 0 | 1 | 0 | 1 | 0 |
| COMPANY J | 1 | 1 | 1 | 1 | 1 | 1 | 0 | 1 | 0 | 1 | 0 |
| COMPANY L | 1 | 1 | 1 | 1 | 1 | 1 | 0 | 1 | 0 | 1 | 0 |
| COMPANY M | 1 | 1 | 1 | 1 | 1 | 1 | 1 | 1 | 0 | 1 | 1 |
| COMPANY N | 1 | 0 | 0 | 1 | 1 | 1 | 1 | 0 | 0 | 1 | 0 |
| COMPANY O | 1 | 1 | 1 | 1 | 1 | 1 | 0 | 1 | 0 | 1 | 0 |
| COMPANY P | 1 | 1 | 1 | 0 | 0 | 0 | 0 | 1 | 0 | 1 | 0 |

FIG. 36

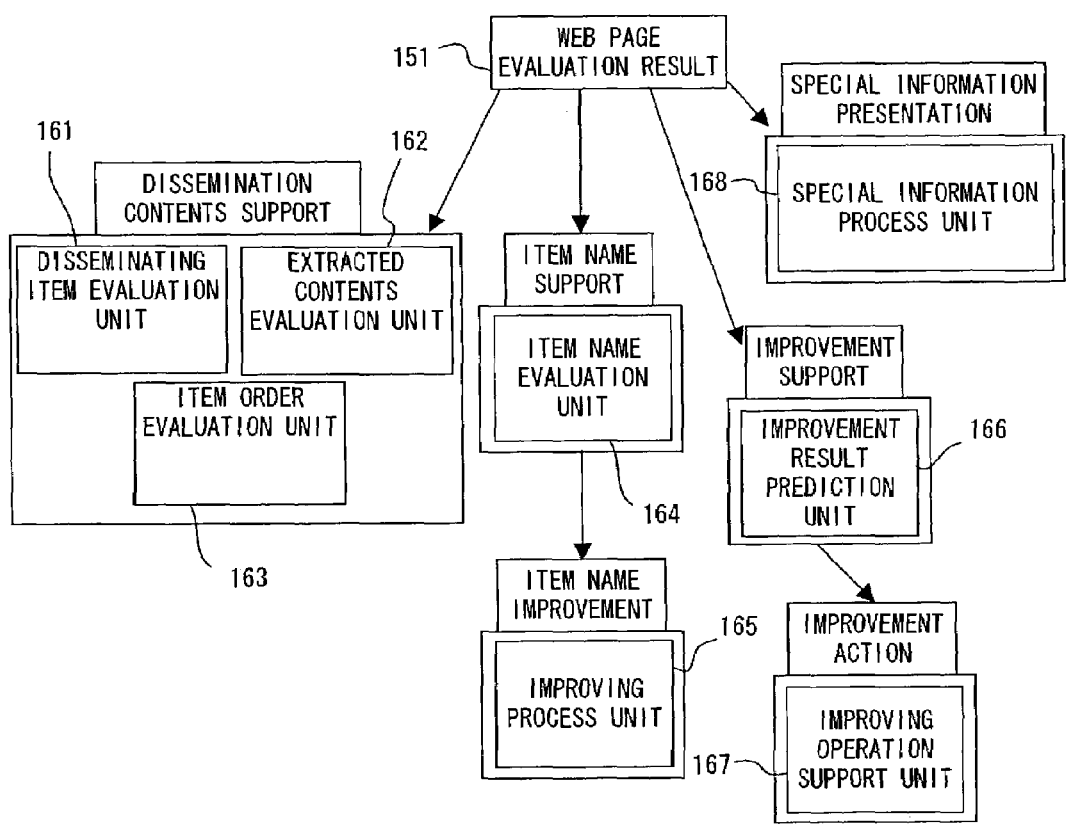
F I G. 3 7

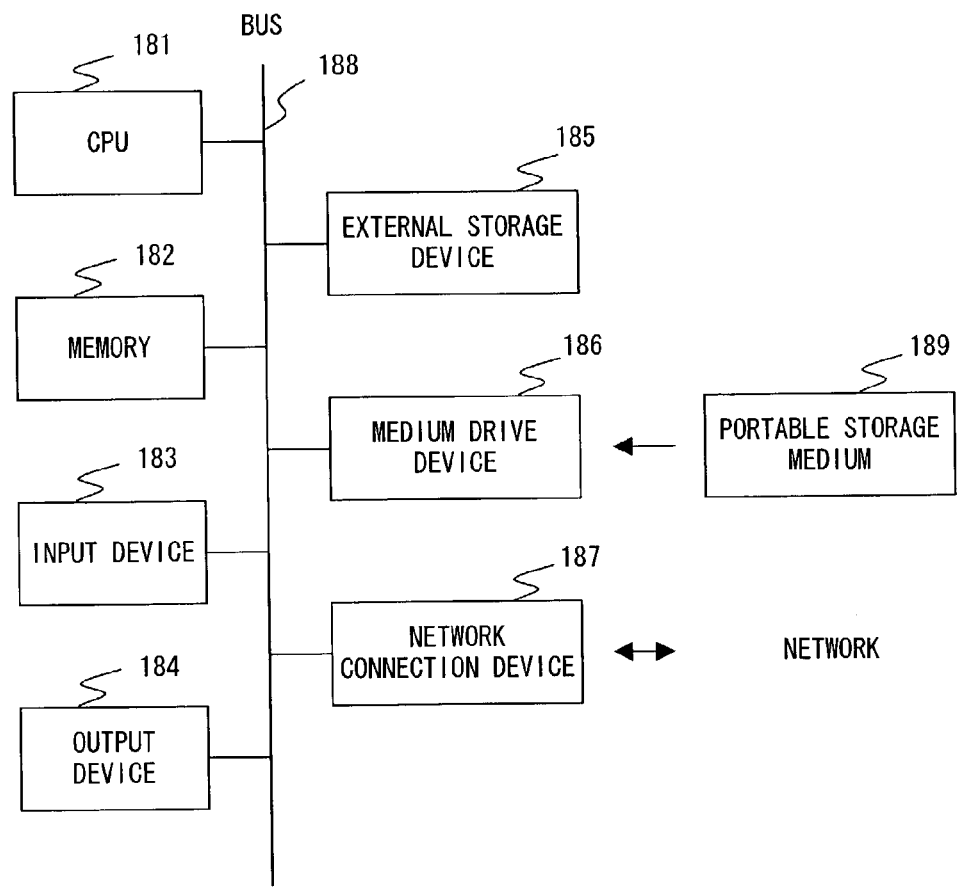
F I G. 39

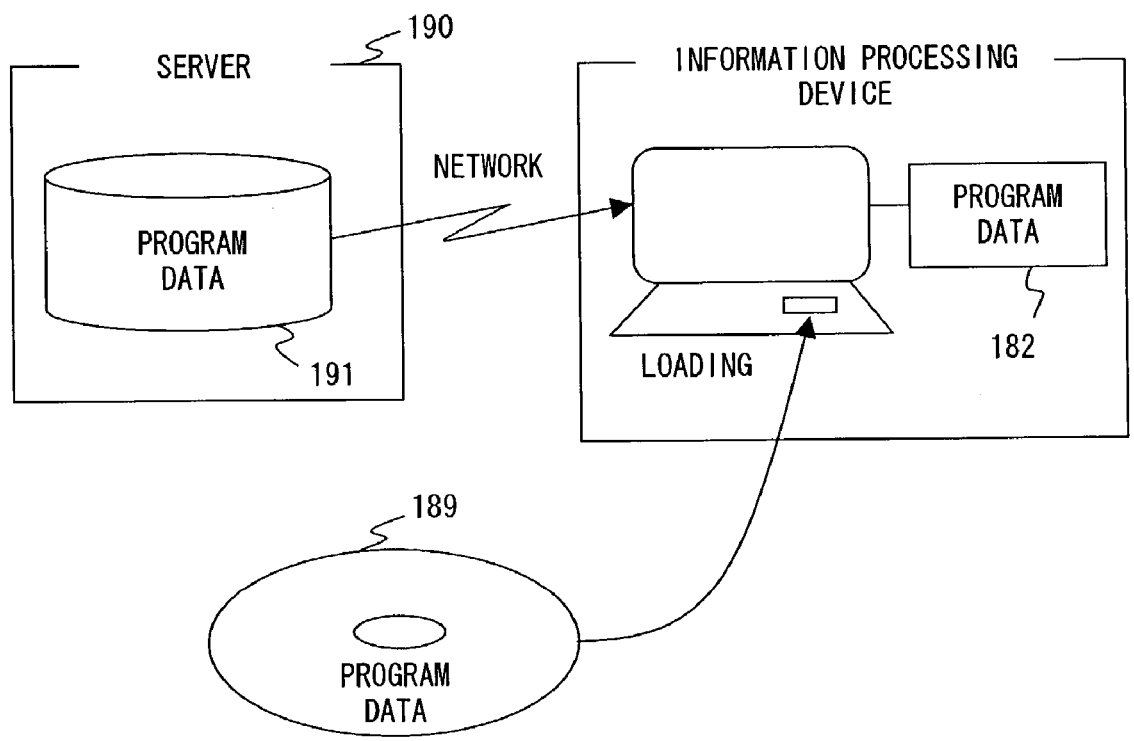
F I G. 4 0

APPARATUS AND METHOD FOR EVALUATING WEB PAGES

BACKGROUND OF THE INVENTION

1. Field of the Invention

The present invention relates to an apparatus and a method for evaluating the information disseminated on Web pages of Internet.

2. Description of the Related Art

A set of Web pages normally comprises a top page and a plurality of pages linked to the top page in a hierarchical structure, and each page includes dissemination information. It is said that there are two through four billions of Web pages in the world. To appropriately disseminate information in a domain by enterprises and persons having the same purpose, it is not satisfactory only to plan to increase the frequency of access to the Web pages or simply arrange the format. Furthermore, since a retrieving technology using a keyword is being widely spread, it is important to appropriately prepare dissemination contents on a Web page to be retrieved.

To attain this, it is necessary to evaluate in detail the contents of the information disseminated on a Web page, and to enhance the value and the completion level of the Web page by properly feeding back the evaluation result.

It is necessary to enhance the completion level of a Web page not only to disseminate information to a viewer, but also to effectively prepare the Web contents for supporting the development technology in the process of developing the technology of extracting information, summarizing information, etc. because the extraction and the summarization of information are based on each piece of target information disseminated on the Web page.

Several evaluation criteria of a Web page have already been suggested as described in the following electronic information mainly in the nations of English speaking people.

J. Alexander and M. A. Tate, Evaluating Web Resources, 1996.

The evaluation criteria are obtained by adding the features of Web to evaluation items on common printed matter. For example, there is 'critical evaluation of a Web page using a check list and its effect' with the current state of Web taken into account and a check list generated including new viewpoints. On the other hand, the value of a Web page can also be computed by the time required to open the Web page with a view to attraction of the attention by the largest possible number of viewers. Furthermore, an attempt to evaluate a Web page by requesting a large number of registered members to answer questionnaires has already been practically realized.

However, in the above mentioned conventional technology, the contents of the descriptions on a Web page are not explained, but formal evaluation and subjective evaluation are mainly described. Therefore, there is the problem that an evaluation value depends on the value judgments and current situation of an evaluator.

SUMMARY OF THE INVENTION

An object of the present invention is to provide an apparatus and a method for practically and objectively evaluating a Web page.

The Web page evaluation apparatus according to the present invention includes a storage device, a generation device, an evaluation device, and an output device.

The storage device stores the correspondence between a plurality of domains in Internet and a plurality of evaluation items. The generation device refers to the correspondence stored in the storage device, extracts an evaluation item corresponding to a specified domain in the plurality of evaluation items, and generates an evaluation set formed by the extracted evaluation items. The evaluation device computes the evaluation score on a Web page to be evaluated using an evaluation item contained in the generated evaluation set, and the output device outputs an evaluation result including the obtained evaluation score.

BRIEF DESCRIPTION OF THE DRAWINGS

FIG. 1 shows the configuration of the evaluation apparatus according to the present invention;
FIG. 2 shows a flow of the process;
FIG. 3 shows the process of a learning unit;
FIG. 4 shows target data of a tag determining process;
FIG. 5 shows the data of a Web page;
FIG. 6 shows the data after a tag cleaning process;
FIG. 7 shows directory information;
FIG. 8 shows a view (1) of an evaluation set;
FIG. 9 shows a view (2) of an evaluation set;
FIG. 10 shows a view (3) of an evaluation set;
FIG. 11 shows a view (4) of an evaluation set;
FIG. 12 shows a view (5) of an evaluation set;
FIG. 13 shows a view (6) of an evaluation set;
FIG. 14 shows the data after a tag assigning process;
FIG. 15 shows the process of detailing a company profile;
FIG. 16 shows the process of detailing product information;
FIG. 17 is a view (1) showing the ontology of an item name;
FIG. 18 is a view (2) showing the ontology of an item name;
FIG. 19 is a view (3) showing the ontology of an item name;
FIG. 20 is a view (1) showing a refined and adjusted evaluation set group;
FIG. 21 is a view (2) showing a refined and adjusted evaluation set group;
FIG. 22 is a view (3) showing a refined and adjusted evaluation set group;
FIG. 23 is a view (4) showing a refined and adjusted evaluation set group;
FIG. 24 is a view (5) showing a refined and adjusted evaluation set group;
FIG. 25 is a view (6) showing a refined and adjusted evaluation set group;
FIG. 26 shows the process of a generation unit;
FIG. 27 is a view (1) showing a weight-assigned specified domain evaluation set;
FIG. 28 is a view (2) showing a weight-assigned specified domain evaluation set;
FIG. 29 is a view (3) showing a weight-assigned specified domain evaluation set;
FIG. 30 is a view (4) showing a weight-assigned specified domain evaluation set;
FIG. 31 is a view (5) showing a weight-assigned specified domain evaluation set;
FIG. 32 is a view (6) showing a weight-assigned specified domain evaluation set;
FIG. 33 shows the process of an evaluation unit;
FIG. 34 is a view (1) showing the evaluation of an information disseminating item;
FIG. 35 is a view (2) showing the evaluation of an information disseminating item;
FIG. 36 shows the evaluation of a detailed information item;
FIG. 37 shows the process of a result processing unit.

FIG. 39 shows the configuration of an information processing device; and

FIG. 40 shows storage media.

DESCRIPTION OF THE PREFERRED EMBODIMENTS

Figure 38:
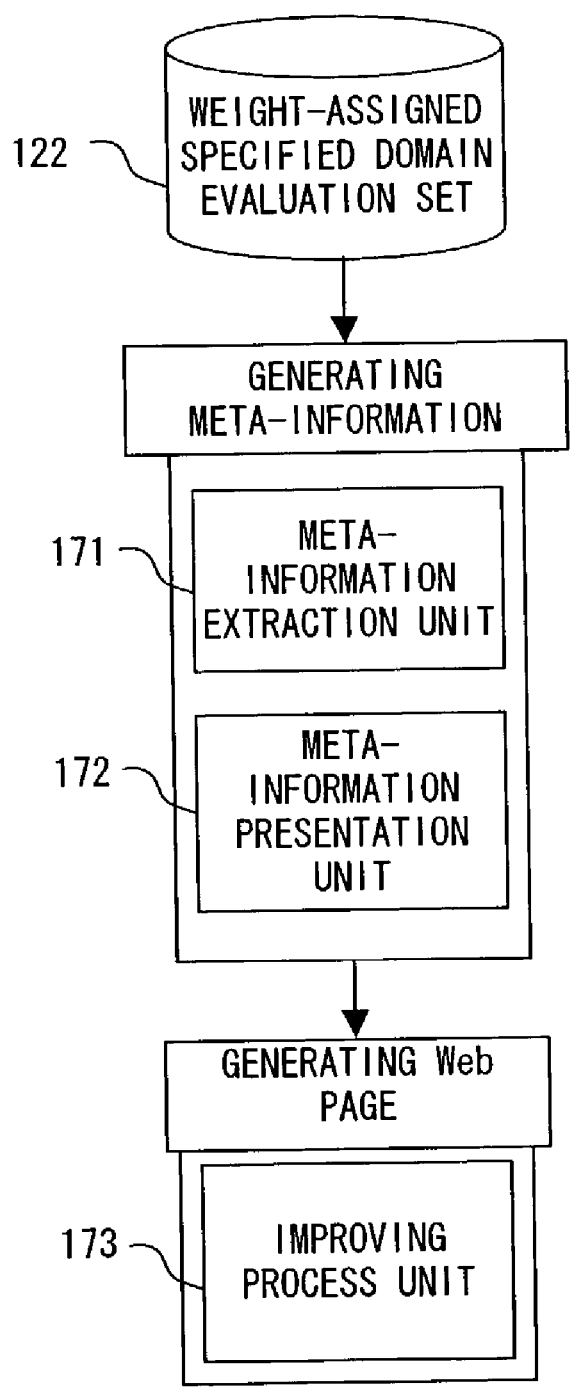
FIG. 38 shows the process of a construction support unit.

The embodiments of the present invention are described below in detail by referring to the attached drawings.

The Web page evaluation apparatus according to the present invention comprises a storage device, a generation device, an evaluation device, and an output device.

The storage device stores the correspondence between a plurality of domains in Internet and a plurality of evaluation items. The generation device refers to the correspondence stored in the storage device, extracts an evaluation item corresponding to a specified domain in the plurality of evaluation items, and generates an evaluation set formed by the extracted evaluation items. The evaluation device computes an evaluation score of a Web page to be evaluated using an evaluation item contained in the generated evaluation set, and the output device outputs an evaluation result containing the obtained evaluation score.

By storing in advance the correspondence between a domain and an evaluation item, when a user specifies an arbitrary domain, the generation device can automatically extract a practical evaluation item corresponding to the domain. Thus, a different evaluation set is generated depending on a specified domain, and the evaluation device computes a different evaluation score depending on the specified domain for the same Web page to be evaluated.

The user can obtain a practical evaluation result only by specifying a domain, and can obtain a different evaluation result by changing the domain. Any user can use the evaluation apparatus and obtain the same evaluation result if the same domain is specified. Therefore, a Web page to be evaluated can be evaluated practically and objectively.

The storage device corresponds to, for example, an external storage device 185 described later by referring to FIG. 39, and the correspondence between domains and evaluation items corresponds to, for example, a refined and adjusted evaluation set group 96 described later by referring to FIG. 3. The generation device and the evaluation device correspond to, for example, a generation unit 22 and an evaluation unit 23 described later by referring to FIG. 1. The output device corresponds to, for example, an output device 184 shown in FIG. 39.

When a Web page is generated, a tool and an application are provided from the viewpoints of the easiness on the generator side, the attractancy of the attention of users, the appropriate representation configuration, etc.

When a Web page is started up, the above mentioned viewpoints are required. However, since there are a number of similar Web pages and the number of Web pages increases ever day, these tools and applications are not enough to obtain a direct effect in generating and maintaining a Web page for dissemination of information. To attain this object, a supporting tool and application relating to the contents of the dissemination information are required.

To consider in detail the contents of the dissemination information, the following three functions are required.

(a) Arranging in detail evaluation items relating to the contents of a domain to be evaluated (b) Determining a score of objective evaluation for the arranged evaluation items (c) Analyzing an evaluation result from various viewpoints of a disseminator, a viewer, etc., and easily satisfying a request from them.

The domain-specified Web page evaluation apparatus according to the present embodiment conducts a consultation of a Web page depending on the evaluation set by arranging the contents of the disseminated information on the Web page as an evaluation set of the domain. The evaluation method is not a total evaluation (visibility, comprehensibility, etc.) of a Web page using the conventional check sheet, questionnaires, etc., but an evaluation method with the contents of each piece of disseminated information taken into account. Sequentially described below are the configuration and the operation of the Web page evaluation apparatus having the functions of (a) through (c).

FIG. 1 shows the configuration of the above mentioned evaluation apparatus. The evaluation apparatus shown in FIG. 1 is configured using an information processing device (computer), and comprises a learning unit 21, a generation unit 22, an evaluation unit 23, a result processing unit 24, and a construction support unit 25. Then, it has the function of evaluating a Web page on which information is disseminated using a specified domain evaluation set based on the disseminated contents and the function of improving the Web page based on the evaluation result.

The learning unit 21 learns an evaluation item from the Web page group in Internet. At this time, all items used in evaluation are extracted and arranged to generate an evaluation set group 26. The evaluation set is a set of evaluation items of each Web page, and formed by information disseminating items and detailed information items. These evaluation items are related to a domain in Internet in the evaluation set.

An information disseminating item is a basic item set in advance as the information to be disseminated when a Web page is generated. A detailed information item is an item obtained by analyzing contents information other than the information disseminating item. As an evaluation set, only information disseminating items can be used, or both information disseminating items and detailed information items can be used. As information disseminating items, for example, data provided with a tag in advance in a Web page is extracted.

Also as a detailed information item, unit information obtained by performing a natural language process on the information expressed by text, and extracting the expressed contents in detail is used. A natural language process can be, for example, a process of assigning a new tag using a pattern matching rule in the expression of text, and a process of extracting a morpheme determined to be noun from among the combinations of a morpheme extracted by the morphological analysis from the expression of text and its part of speech.

The generation unit 22 extracts an evaluation set in the user-specified domain from the evaluation set group 26, arranges the evaluation items, and generates a specified domain evaluation set 27. Upon receipt of a Web page to be evaluated, the evaluation unit 23 evaluates the contents using the specified domain evaluation set 27, and outputs an evaluation result. The result processing unit 24 presents an evaluation result to the user, and performs a process for improving the contents of the Web page based on the evaluation result. The construction support unit 25 supports the construction of a new Web page using the specified domain evaluation set 27.

With the above mentioned configuration, the user can flexibly specify a domain, and practically and objectively evaluate a Web page using an evaluation set optimized for a specified domain. Furthermore, the processes for presenting an evaluation result and improving a Web page can be smoothly performed. A user of the evaluation apparatus can be a disseminator and a viewer of the information.

FIG. 2 is a flow of the process performed by the evaluation apparatus shown in FIG. 1. First, the learning unit 21 extracts (31) information disseminating items from the Web page using the Web page cleaning technology, the morphological analysis technology, etc. when an evaluation item is learned from the Web page group, and registers them as an evaluation set in the database. Thus, the evaluation set group 26 of a Web page group is generated.

A mix-up occurs when an information disseminating item is selected and utilized if the extracted information disseminating items are collected at random. Therefore, the learning unit 21 arranges and sorts (32) the information disseminating items for each category contained in a system of a Web page group (a system of domains) according to directory information 33 for arranging the system, thereby generating an evaluation set.

However, sufficient evaluations with the contents taken into account cannot be conducted only using information disseminating items. Therefore, the learning unit 21 refines evaluation items so that the described contents can be considered in detail by utilizing the elements of the contents to be processed in extraction of information, summarization of information, etc., which are contents analyzing technology, as evaluation items, thereby generating a refined evaluation set group (34).

At this time, the learning unit 21 applies the contents analyzing technology such as the information extracting rule (for extracting information from text), etc. prepared in advance to the evaluation set group of information disseminating items, extracts a detailed information item, and extends the evaluation set group 26.

In the extracted information disseminating items and detailed information items, various expressions are used for the same item, and it is difficult to correctly evaluate data as is. Therefore, the learning unit 21 removes the fluctuation in expression (unification) using the ontology (dictionary of synonyms) 36 for each category of the system, and the evaluation items are appropriately arranged (35). For example, for the information disseminating items for each category arranged in the system, the item names are unified and standardized using the ontology 36 depending on the category, thereby unifying and standardizing the evaluation set group 26.

Then, the user selects some unnecessary categories from among a plurality of categories systematically arranged in advance, thereby specifying a domain. The generation unit 22 generates the specified domain evaluation set 27 from the evaluation set group 26 (41). Thus, a domain-dependent evaluation result can be obtained by limiting the domain to be evaluated based on the system arranged systematically in advance.

However, evaluation of the disseminated information of the domain cannot be sufficiently performed in some cases by using only the evaluation items extracted from an actual Web page. Therefore, necessary items are added according to the recent trend, new tendency, request, etc., and the extracted items are corrected by providing the respective functions (42).

Thus, the user can add necessary items (required and expected) to the specified domain evaluation set 27. The added items are extracted as new items from, for example, the trend of the entire industry of the domain, the questionnaires to the persons concerned, interested clients, etc.

There are also the cases in which the weight of evaluation of an evaluation item of the specified domain evaluation set 27 is to be changed for each category. In these cases, a function of assigning a weight in each category is provided (43). The weight is assigned by, for example, setting a computation function for each category, etc.

There can be the case in which a weight of evaluation is changed for each evaluation item depending on the evaluation viewpoint, etc. in the domain of the same category. In this case, a function of assigning a weight is provided for each evaluation item of the specified domain evaluation set 27 (44).

The viewpoint of assigning a weight is, for example, a providing enterprise side, a client side, an enterprise utilizing side, an information collecting side, etc. Depending on the viewpoint, the significance is determined for each item, and the weight is adjusted for each item. Furthermore, based on the ranking of each Web page, a weight can be assigned by the commonness of the items on the high ranking pages. The ranking in this case can be a significance ranking depending on the number of linked Web pages, the common popularity ranking, etc.

When the learning unit 21 and the generation unit 22 perform the above mentioned processes, the evaluation items in each domain to be evaluated can be practically arranged in detail with the contents of the disseminated information taken into account.

Then, the evaluation unit 23 evaluates the Web page to be evaluated by the evaluation item of the specified domain evaluation set 27 (51). Since it is necessary to output an evaluation result as quantitative information for a specified domain, an evaluation score is computed. There are some score computing methods, and a user can specify an arbitrary computing method.

In simple score computation, the existence of each information disseminating item of the specified domain evaluation set 27 is checked on a Web page to be evaluated, and the evaluation score can be simply computed from the number of existing items (52).

In the score computation including the URL (uniform resource locator) hierarchy, the evaluation score is computed with the depth of the hierarchy (link) from the top page taken into account for each page containing the information about each information disseminating item to incorporate the viewpoint of the user convenience into the evaluation score (53).

In the score computation in the order of items, an evaluation score is computed using the display order of the evaluation items of the specified domain evaluation set 27 on the Web page to be evaluated (54). The item display order can be obtained from the position of the item in the menu, the pop-up window, etc., and the evaluation score can be computed in the common order computed in the specified domain as a reference.

In the score computation of an information extraction result, the existence of each detailed information item of the specified domain evaluation set 27 is checked on the Web page to be evaluated, and the evaluation score is computed from the number of existing items (55). At this time, it is determined whether or not there is a corresponding detailed information item by actually analyzing the contents of the Web page to be evaluated.

In the score computation including the extension of the description of an extraction result, an evaluation score is computed for the page including the information about each detailed information item with the depth of the hierarchy from the top page and the extension of the description position in contents analysis taken into account to consider the viewpoint of user convenience for a detailed information item (56).

An objective score determination is performed on arranged evaluation items by the evaluation unit 23 performing a score computation as described above.

Then, the result processing unit 24 displays a computed evaluation score as an evaluation result on the screen (61).

When there is a fluctuation in expression in the same domain, a displayed evaluation result can be mistakenly understood by a user. Therefore, a function of performing a support (issuing an instruction) when an expression different from the common expression in the corresponding domain is used on each Web page is provided (62).

By the function, the result processing unit 24 presents advice of correcting an item name using the category-dependent ontology for the evaluation item for each category in the specified domain evaluation set 27. Thus, the user can correct the item name appropriately.

Furthermore, the result processing unit 24 can start up the interface for automatically making a correction instead of presenting advice to the user. In this case, at an instruction from the system, the fluctuation in expression in the same domain is actively corrected (63).

Although the evaluation result is quantitatively obtained in a specified domain by presenting an evaluation score, it is necessary to recognize what items and contents have problems when a user (disseminator) requests to take action for improvement of the obtained evaluation. Therefore, the result processing unit 24 presents the specific evaluation items and contents which have lowered the score for use in a Web page improving method (64)

Furthermore, if it is known how the evaluation result quantitatively changes by changing which item can be quantitatively changed as the improvement action 65 for the evaluation, a plan of the order of operations can be made after recognizing an improvement effect. Therefore, the result processing unit 24 predicts and presents the influence of the improvement result of each item on an evaluation score (66). For example, a new evaluation score is computed when some information disseminating items are actually added, and the value is presented.

The result processing unit 24 not only performs a simulation of the improvement of each item, but also actually starts up the input interface to allow a user to perform an improving operation (adding a necessary item, correcting the contents of disseminated contents, etc.) (67). In this case, an activated input interface automatically displays an input form for an improving operation.

In the evaluation of the contents of a Web page, the amount of the information to be disseminated which is contained (or missing) is presented as a main evaluation result. However, whether or not there is disseminated information unique to the Web page to be evaluated and not found on other Web pages is useful information to the manager of the Web page. Such information can be collected as a by-product during the evaluating process.

The result processing unit 24 presents an item other than the evaluation items of the specified domain evaluation set 27 as special information, and give advice that it corresponds to an odd item, a pulling power item, a wasteful item, etc. (68).

When the result processing unit 24 performs the above mentioned process, an evaluation result can be analyzed from various viewpoints such as the viewpoint of a disseminator, a viewer, etc., and the process can be easily performed at a request from them.

The construction support unit 25 supports a user when constructing a new Web page corresponding to a specified domain (71).

When a new Web page is generated, the support of adopting an item arrangement, an expression method, etc. is required, and a number of generation supporting tools are actually used. However, no support of specifying the contents of dissemination information, etc. in a specified domain is currently offered.

Using the construction support unit 25, suitable items and contents information can be presented to a user who desires to generate a new Web page in a specified domain using the information generated for evaluation of a Web page and disseminate information.

At this time, the user specifies a domain by selecting a category, and the construction support unit 25 generates basic meta-information about dissemination of information from the specified domain evaluation set 27, and presents it to the user (72). The basic meta-information can be a standard tag set, the DTD (document type definition) of an XML (extensible markup language), etc.

Furthermore, the construction support unit 25 not only presents the basic meta-information, but also actually starts up an input interface and allows the user to perform an information inputting operation for actual generation of a Web page according to the basic meta-information (73). The activated input interface automatically displays an input form for input of information according to the basic meta-information.

When the construction support unit 25 performs the above mentioned process, a disseminator can efficiently generate a Web page including the information corresponding to an evaluation item of a specified domain.

Then, a specific example of each process shown in FIG. 2 is explained by referring to FIGS. 3 through 38.

FIG. 3 shows the process of the learning unit 21. The learning unit 21 shown in FIG. 3 comprises a cleaning unit 81, an item extraction unit 82, a system arrangement unit 83, a system correspondence process unit 84, an information extraction unit 85, and an item fluctuation check unit 86, and outputs a refined and adjusted evaluation set group 96 using the input of a Web page group in Internet. The important function of the learning unit 21 is extracting evaluation items from a Web page and systematizing the extracted evaluation items.

First, the cleaning unit 81 performs Web cleaning to remove unnecessary tags and dust from the information on the Web page. By the Web cleaning, the part not to be processed as text such as a banner advertisement, moving picture/still image information, etc. displayed on the Web page can be removed.

Then, the item extraction unit 82 extracts tagged information as an information disseminating item 91 by performing a tag determining process, a tag cleaning process, a morphological process, a part-of-speech determining process, etc. on the cleaned information. The tag determining process is performed by extracting a tag of a menu item displayed on the Web page. For example, when the data as shown in FIG. 4 is given, the alt data used in the img tag, etc. is to be extracted. Furthermore, the tag cleaning process is to remove a tag from the given data.

FIG. 5 shows the description relating to a company profile contained in a Web page of a hypothetical enterprise. When such data is given, the tag cleaning removes a tag such as TABLE, TR, TD, B, etc. For example, when the tag cleaning is performed on a portion 101 of the data, the data shown in FIG. 6 is extracted.

The morphological process is performed by applying a morphological analysis, which is a common natural language process tool, to the portion of text information, and extracting a candidate for an evaluation item with a divided unit as a target. The part-of-speech determining process is performed by, for example, determining a part of speech of unit information divided in the morphological process, and extracting a specific part of speech as a candidate for an evaluation item. In this example, unit information that is recognized as a noun and appears N (for example, N=3) times or more is extracted as a candidate.

The system arrangement unit 83 shown in FIG. 3 arranges in advance the system of the Web page group as the directory information 33. The directory information 33 is obtained by systematizing the categories of the Web page group, and is utilized in arranging the evaluation items of an evaluation set group 93 which is a learning result.

FIG. 7 shows an example of the directory information 33. The directory information has a hierarchical structure of 6 layers formed by categories 1 through 6, and each category has other categories at lower layers. For example, the 'industry' of category 1 corresponds to the highest layer, and the 'company M' of category 6, etc. corresponds to the lowest layer. Furthermore, the categories of the 'primary industry' are 'agriculture', 'fishing', 'livestock industry', 'forestry', and 'hunting'.

The system correspondence process unit 84 checks the part of the system of the directory information 33 corresponding to the extracted item, generates a systematized information disseminating item 92 as a combination of each item and a corresponding category, and stores it in the evaluation set group 93.

FIGS. 8 through 13 show an example of the evaluation set group 93 generated by extracting evaluation items (information disseminating items) from the Web pages actually through Internet. The extracted information disseminating items can be classified into a common item common to all Web pages, a specific item specific to each category, and an individual item specific to each Web page.

FIG. 8 shows the name, URL, and common items of the enterprises belonging to the category of a 'food manufacturer'. FIG. 9 shows specific items and individual items of the enterprises. FIG. 10 shows the name, URL, and common items of the enterprises belonging to the category of a 'cosmetics manufacturer'. FIG. 11 shows specific items and individual items of the enterprises. Furthermore, FIG. 12 shows the name, URL, and common items of the enterprises belonging to the category of an 'automobile manufacturer'. FIG. 13 shows specific items and individual items of the enterprises.

In FIGS. 9, 11, and 13, the description order of specific items and individual items corresponds to the description order of the company names shown in the corresponding FIGS. 8, 10, and 12.

Then, the information extraction unit 85 extracts detailed information item 95 from the information on the Web page based on information extracting rule 94 stored in advance, and adds it to the information disseminating items of the evaluation set group 93. In this example, a detailed information item is extracted by assigning a new tag to the information on the Web page.

For example, the data as shown in FIG. 14 can be obtained when a tag is assigned based on the information extracting rule. In FIG. 14, tags of annunciator organization information, foundation information, element1, date of foundation, establishment information, date of establishment, uncertain organization supplementary information, other information, president information, capital information, and employee information are newly assigned. In this process, date of foundation, date of establishment, president information, capital information, employee information, etc. are extracted as detailed information items.

FIG. 15 shows an example of detailed information items obtained by describing in detail the information disseminating item of 'company profile'. By applying the information extracting rule to the contents information disseminated in the item of 'company profile', detailed information items such as the company name, address, telephone number, representative (president), capital, foundation year, establishment year, number of employees, etc. are extracted.

FIG. 16 shows an example of detailed information items obtained by describing in detail the information disseminating item of 'product information'. In this example, by applying the information extracting rule to the contents information disseminated in the item of 'product information', the detailed information items such as a product name, type information, product supplementary information, manufactured product information, manufacturing organization information, manufacturing organization supplementary information, etc. are extracted.

Thus, by describing in detail the information disseminating item in the information extracting process, the evaluation items of the evaluation set group 93 is refined.

Then, the item fluctuation check unit 86 performs a name unifying process using the ontology 36, and removes the fluctuation in item names. Thus, the item names of the evaluation set group 93 are unified into a representative item name for each category, and the standardization of item names can be realized.

FIGS. 17 through 19 show examples of the ontology 36. FIGS. 17, 18, and 19 show the representative names of the respective items belonging to the categories of the 'food manufacturer', 'cosmetics manufacturer', and 'automobile manufacturer', and the names of the corresponding prospects. The representative name can be, for example, selected using the number of occurrences of each item name as a reference.

FIGS. 20 through 25 show an example of the refined and adjusted evaluation set group 96 generated as a learning result of an evaluation set group. In these figures, the evaluation sets of respective categories of the 'food manufacturer', 'cosmetics manufacturer', and 'automobile manufacturer', and evaluation sets of respective enterprises are listed. However, in this example, only the information disseminating items are indicated for convenience. These items are classified into the representation of the common top menu, specific item by industry, and other menus.

FIG. 20 shows the names of the enterprises belonging to 'food manufacturer', the structure of the top page (top structure), and the representation of the common top menu. FIG. 21 shows the specific items by industry and other menus of the enterprises. FIG. 22 shows the names of the enterprises belonging to 'cosmetics manufacturer', the structure of the top page, and the representation of the common top menu. FIG. 23 shows the specific items by industry and other menus of the enterprises. FIG. 24 shows the names of the enterprises belonging to 'automobile manufacturer', the structure of the top page, and the representation of the common top menu. FIG. 25 shows the specific items by industry and other menus of the enterprises.

In FIGS. 21, 23, and 25, the description order of specific items by industry and other menus corresponds to the description order of the enterprise names in FIGS. 20, 22, and 24.

In FIGS. 20, 22, and 24, the representative item names such as 'new arrivals', 'release', etc. are added to each of the categories of 'food manufacturer', 'cosmetics manufacturer', and 'automobile manufacturer'.

Furthermore, in FIG. 21, the representative item name such as 'plant tour', 'top text message', etc. is added. In FIG. 23, the representative item name such as 'cosmetology', 'fashion', etc. is added. In FIG. 25, the representative item name such as 'plant tour', 'recall', etc. is added.

Then, FIG. 26 shows the process performed by the generation unit 22. The generation unit 22 shown in FIG. 26 comprises a category selection unit 111, a partial system selection unit 112, an item addition unit 113, a category generation unit 114, a category selection unit 115, a weight assignment unit 116, an item selection unit 117, and a weight assignment unit 118, receives the refined and adjusted evaluation set group 96, and outputs a weight-assigned specified domain evaluation set 122.

To select a specified domain evaluation set 121 from the refined and adjusted evaluation set group 96, the functions of specifying a domain, and adding and correcting an item are important. When the user specifies a domain, each category of a systematized evaluation set can be selected, and a set of categories can be selected by specifying a category in a higher layer using the partial system selection unit 112. Each category corresponds to the URL of each Web page, and a set of categories correspond to a set of a plurality of Web pages.

When one or more categories contained in the lowest layer in the system are selected using the category selection unit 111, all selected categories are specified as a domain. If a higher layer category is specified by the partial system selection unit 112, then the specified category and the lower layer categories enclosed by it are specified as a domain. Therefore, using the category selection unit 111 and the partial system selection unit 112, each of the necessary categories can be picked up or a portion of a systematic structure can be selected, thereby specifying a domain.

Then, evaluation items corresponding to the selected categories are extracted from the refined and adjusted evaluation set group 96, and the specified domain evaluation set 121 is generated.

When the evaluation items extracted from the existing Web pages are not sufficient, the user adds an item to and modifies the evaluation items of the specified domain evaluation set 121 using the item addition unit 113 and the category generation unit 114. At this time, the item addition unit 113 adds the item input by the user to each category. Furthermore, the category generation unit 114 deletes a user-specified item from the items in the category, or changes the category name into a user-specified name.

To process each evaluation item of the specified domain evaluation set 121 with the significance level assigned to each evaluation item, the category weighting process and the item weighting process are important functions. In the category weighting process, the user selects a category to be weight-assigned using the category selection unit 115, and specifies the weight to be assigned using the weight assignment unit 116. In the item weighting process, the user selects an item to be weight-assigned using the item selection unit 117, and specifies a weight to be assigned using the weight assignment unit 118. Thus, a weight-assigned specified domain evaluation set 122 is generated.

FIGS. 27 through 32 show an example of the weight-assigned specified domain evaluation set 122. In this example, however, it is assumed that all categories of the evaluation set group shown in FIGS. 20 through 25 are specified as a domain.

In FIGS. 28, 30, and 32, the description order of specific items by industry and other menus corresponds to the description order of enterprise names shown in the corresponding FIGS. 27, 29, and 31.

In FIGS. 27, 29, and 31, the weight of a category is assigned for each category of an enterprise name, and the weight of an item is assigned for each item of representation of a common top menu. Furthermore, in FIGS. 28, 30, and 32, the weight of an item is assigned for each specific item by industry.

In the evaluation set group shown in FIGS. 20 through 25, when only a part of the categories are specified as a domain, only the evaluation items of the specified portion are extracted, and the specified domain evaluation set 121 and the weight-assigned specified domain evaluation set 122 are generated. For example, when 'food manufacturer' is specified as a domain, a weight-assigned specified domain evaluation set 122 is configured by the evaluation items shown in FIGS. 27 and 28.

Then, FIG. 33 shows the process of the evaluation unit 23. As a pre-process of the evaluation unit 23, an information disseminating item 131 is extracted from the Web page to be evaluated by the cleaning unit 81 and the item extraction unit 82 shown in FIG. 3, and a detailed information item 132 is extracted by the information extraction unit 85 from the Web page to be evaluated. Then, the item fluctuation check unit 86 unifies the names of the items, and arranged items to be evaluated for the Web page to be evaluated are prepared.

The evaluation unit 23 shown in FIG. 33 comprises an item check unit 141, a hierarchy check unit 142, an extraction contents check unit 143, an extension check unit 144, and an order check unit 145, receives the weight-assigned specified domain evaluation set 122, the information disseminating item 131, and the detailed information item 132, and outputs a Web page evaluation result 151.

The item check unit 141 and the hierarchy check unit 142 performs the process of an information disseminating item level, and the extraction contents check unit 143 and the extension check unit 144 performs the process of a detailed information item level. Furthermore, the order check unit 145 performs the process relating to both of these items.

The item check unit 141 checks the existence/non-existence of an information disseminating item, and performs a simple score computation. At this time, it is checked whether or not the contents information corresponding to each information disseminating item in the evaluation set 122 is contained in the item to be evaluated which is extracted from the Web page to be evaluated. The item check value of the existing item is set to 1, and the item check value of the non-existing item is set to 0. If there is a weight assigned to each item, then it is taken into account in computing the score of each item.

For example, as shown in FIGS. 27 through 32, the score is computed by multiplying the item check value indicating the existence/non-existence of an item by (weight of item/10) when 10 ranks of weights are assigned using the integers of 1 through 10. The evaluation score is computed by the following equations.

score of each item=item check value*weight of item/ 10 evaluation score=sum of scores of items/number of items

FIGS. 34 and 35 show examples of item check values of information disseminating items when the Web page of each enterprise is evaluated using the 'food manufacturer' as a specified domain. FIG. 34 shows the item check values of the representation of a common top menu on the Web page of each enterprise. FIG. 35 shows the item check values of the specific items by industry on the Web page.

The hierarchy check unit 142 checks the hierarchical position of an information disseminating item on the Web page to be evaluated by performing an URL hierarchical computation, and performs a score computation based on the result. At this time, the appearance layer number of the top page for the Web page to be evaluated is assumed to be 1, and the appearance layer number (depth) of each information disseminating item is computed. Then, the item check value is multiplied by the reciprocal of the appearance layer number to obtain a score of each item. In this case, the evaluation score is computed by the following equations.

score of each item=item check value*(weight of item/
10)*(1/appearance layer number evaluation score=sum of scores of items/number of
items The extraction contents check unit 143 checks the existence/non-existence of a detailed information item, and performs a score computation including an extraction result. At this time, it is checked whether or not the contents information corresponding to each detailed information item in the specified domain evaluation set 122 is contained in the item to be evaluated extracted from the Web page to be evaluated. Then, the evaluation score is computed using the algorithm of the simple score computation by the item check unit 141.

FIG. 36 shows examples of item check values of detailed information items on the Web page of each enterprise shown in FIG. 34. In this example, an item check value is indicated for each item of 'enterprise name', 'capital', etc.

The extension check unit 144 checks the extension of the position and description of a detailed information item before performing a score computation. At this time, on a Web page to be evaluated, the sequence of a plurality of detailed information items and the separation degree among the items are computed. The separation degree indicates how many other items exist between two items, and is set to 1 when no other items exist. Then, the item check value is multiplied by the reciprocal of the separation degree to compute the score of each item. In this case, the evaluation score is computed by the following equations.

score of each item=item check value*(weight of item/
10)*(1/separation degree)

evaluation score=sum of scores of items/number of
items

For example, when a 'post code' and an 'address' are extracted as detailed information items, the evaluation score is high when these items are close to each other, and the evaluation score is low when they are separate from each other.

The order check unit 145 checks the display order of information disseminating items and detailed information items, and performs a score computation. At this time, it obtains the order (sequence of menu items, etc.) on the Web page to be evaluated of the evaluation items of the specified domain evaluation set 122, compares the order with the reference order, and computes the evaluation score. The reference order is, for example, computed in advance from the items of the Web page of a specified domain.

If there is a weight assigned to each category in the score computation of each item, then the score computation is performed with the weight taken into account. In this case, for example, the item check value*(weight of item/10) is multiplied by (weight of category/10), thereby computing the score of each item.

By the above mentioned score computation, the three types of values, that is, the evaluation score at an information disseminating item level, the evaluation score at a detailed information item level, and the evaluation score by an item order, can be computed. An averaging process depending on the number of items can be applied to the evaluation scores at the information disseminating item level and the detailed information item level.

FIG. 37 shows the process of the result processing unit 24. The result processing unit 24 shown in FIG. 37 comprises a disseminating item evaluation unit 161, an extracted contents evaluation unit 162, an item order evaluation unit 163, an item name evaluation unit 164, an improving process unit 165, an improvement result prediction unit 166, an improving operation support unit 167, and a special information process unit 168, presents an evaluation result to the user using the Web page evaluation result 151 as input, and supports the improving operation of the Web page.

The disseminating item evaluation unit 161 presents the evaluation score at the information disseminating item level, and the score of each information disseminating item. The extracted contents evaluation unit 162 presents the evaluation score at the detailed information item level, and the score of each detailed information item. The item order evaluation unit 163 presents the evaluation score by the item order.

Presenting not only the evaluation score but also the score of each item allows the user to easily recognize a low evaluation item, thereby taking improvement action. For example, if the item score is 0, the corresponding item does not exist on the Web page. Therefore, by adding the item to the Web page, the Web page is improved.

The item name evaluation unit 164 displays the fluctuation in expression of an item name on a Web page, obtains an appropriate representative item name using the ontology, and presents it as a modification candidate. Thus, the user can easily modify the item name to the presented representative item name. Furthermore, the improving process unit 165 starts up an interface for modifying the fluctuation in expression. The activated interface automatically modifies an item name to a representative item name.

The improvement result prediction unit 166 predicts an improvement result of an item contained in the evaluation result, and presents it. For example, if there is an information disseminating item whose item score is 0, the improvement result prediction unit 166 requests the evaluation unit 23 to perform the score computation with the above mentioned item virtually added, and presents the obtained evaluation result to the user. Furthermore, the improving operation support unit 167 starts up the input interface to support the improving operation. The activated input interface automatically displays an input form, and reflects the change input by the user on the Web page.

The special information process unit 168 performs an information difference computation, checks whether or not an item other than the evaluation item (difference item) is contained on the Web page. If a difference item is contained, then it is displayed as special information. Thus, the user can recognize that unique information not obtained in a specified domain has been disseminated.

FIG. 38 shows the process of the construction support unit 25. The construction support unit 25 shown in FIG. 38 comprises a meta-information extraction unit 171, a meta-information presentation unit 172, and an improving process unit 173, and supports the construction of a new Web page using the weight-assigned specified domain evaluation set 122 as input.

The meta-information extraction unit 171 generates meta-information (tag set, DTD, etc.) in a specified domain from the evaluation items of the specified domain evaluation set 122. The meta-information presentation unit 172 presents the extracted meta-information to the user.

The improving process unit 173 starts up an input interface, and the activated input interface automatically displays an input form according to the meta-information, and generates a Web page containing the information input by the user.

The evaluation device shown in FIG. 1 is configured, for example, using the information processing device (computer) as shown in FIG. 39. The information processing device shown in FIG. 39 comprises a CPU (central processing device) 181, memory 182, an input device 183, an output device 184, an external storage device 185, a medium drive device 186, and a network connection device 187. They are interconnected through a bus 188.

The memory 182 comprises, for example, ROM (read only memory), RAM (random access memory), etc. and stores a program and data for use in the process. The CPU 181 performs a necessary process by executing the program using the memory 182. In this case, the learning unit 21, the generation unit 22, the evaluation unit 23, the result processing unit 24, and the construction support unit 25 shown in FIG. 1 correspond to the program stored in the memory 182.

The input device 183 can be, for example, a keyboard, a pointing device, a touch panel, etc., and are used in inputting an instruction and information from a user. The output device 184 can be, for example, a display, a printer, a speaker, etc., and are used in outputting an inquiry to a user, and a process result (evaluation result, etc.).

The external storage device 185 can be, for example, a magnetic disk device, an optical disk device, a magneto-optic disk device, a tape device, etc. The information processing device stores the above mentioned program and data in the external storage device 185, and loads to the memory 182 to use them as necessary. The external storage device 185 is also used as a database storing the directory information 33 and the ontology 36 shown in FIG. 2, and a database accumulating the refined and adjusted evaluation set group 96 shown in FIG. 2.

The medium drive device 186 drives a portable storage medium 189, and accesses the stored contents. The portable storage medium 189 can be an arbitrary computer-readable storage medium such as a memory card, a flexible disk, CD-ROM (compact disk read only memory), an optical disk, a magneto-optic disk, etc. A user stores the above mentioned program and data in the portable storage medium 189, and loads them to the memory 182 and uses them as necessary.

The network connection device 187 is connected to an arbitrary communications network such as a LAN (local area network), Internet, etc., and converts data during the communications. The information processing device receives the above mentioned program and data through the network connection device 187, loads them to the memory 182, and uses them as necessary.

FIG. 40 shows computer-readable storage media capable of providing a program and data for the information processing device shown in FIG. 39. The program and data stored in the portable storage medium 189 and a database 191 of a server 190 are loaded to the memory 182. The server 190 generates a propagation signal for propagating the program and data, and transmits them to the information processing device through an arbitrary transmission medium in a network. The CPU 181 executes the program using the data, and performs a necessary process.

The evaluation of a Web page has been a subjective or conventional evaluation of a viewer. However, according to the present invention, evaluation items for a specified domain realizes a practical and objective evaluation of a Web page.

Additionally, not only an item set in advance when a Web page is generated, but also an item obtained by a contents analysis can be used as an item to be evaluated. Therefore, a more detailed evaluation can be obtained. Furthermore, by freely selecting a specified domain depending on the URL and systematic structure, evaluation items can be flexibly set, and a weight can be assigned to evaluated contents in some methods, thereby obtaining an appropriate evaluation result.

Furthermore, various detailed information items accumulated for evaluation of a Web page can be used as basic data for construction of an ontology for each specified domain. The construction of an ontology requires advanced know-how of experts in each field. Therefore, no ontology has been easily generated. Additionally, a large cost is required to maintain the ontology by appropriately understanding the trend which changes with time. However, using the technology of the present invention, these basic operations can be easily realized.

When a new Web page is generated, the function of supporting a Web page construction process using a detailed information item extracted in a specified domain, not a browsing function or a conventional constructing support, can be realized. It is indispensable to provide the optimum Web page generation interface, but under the present situation with an increasing number of Web pages, a construction support for detailed information items is specifically demanded.

What is claimed is:

1. A Web page evaluating method comprising:

storing in advance, a correspondence between a plurality of domains, each of the plurality of domains including at least one category having a Web page group comprising Web pages for dissemination of information on the Internet, and a plurality of evaluation items related to the domains to objectively evaluate information disseminating items, and determining said correspondence between the plurality of domains and the plurality of evaluation items by extracting the information disseminating items set in advance from information in the Web page group, said information disseminating items including contents of dissemination information from the Web pages, based on evaluation criteria specific to information disseminating items of the Web pages;

extracting and arranging stored evaluation items corresponding to a specified domain from the plurality of evaluation items;

generating an evaluation set including the extracted, stored evaluation items for the specified domain;

extracting the information disseminating items from a Web page to be evaluated, corresponding to the extracted, stored evaluation items of the generated evaluation set;

computing an evaluation score of the Web page using the evaluation items included in the generated evaluation set and obtaining a hierarchical depth comprising a reciprocal of an appearance number from a top page of the Web page to be evaluated for each information disseminating item contained in the evaluation set; and presenting an evaluation result including the computed evaluation score.

2. The method according to claim 1, wherein said determining extracts data assigned a tag in advance as an information disseminating item from the information in the Web page group.

3. The method according to claim 1, wherein said computing checks whether each information disseminating item included in the evaluation set exists in the Web page to be evaluated, and computes the evaluation score.

4. The method according to claim 1, wherein
said determining comprises analyzing contents information of an information disseminating item, extracts a detailed information item from the contents information, and adds the detailed information item to the evaluation items in the evaluation set.

5. The method according to claim 4, wherein
said determining further comprises analyzing contents information of the Web page to be evaluated and extracts detailed information items from the Web page to be evaluated, said computing checks whether each detailed information item included by the evaluation set exists among the detailed information items extracted from the Web page to be evaluated, and computes the evaluation score.

6. The method according to claim 4, wherein
said computing checks how detailed information items, which are included in the evaluation set and related each other, are separated in the Web page to be evaluated, and computes the evaluation score.

7. The method according to claim 1, wherein
said determining comprises referring to directory information indicating a system of categories of the Web page group, and classifying the information disseminating items for each category included by the directory information, thereby determining the correspondence between the plurality of domains and the plurality of evaluation items.

8. The method according to claim 7, wherein
said determining further comprises unifying names of the evaluation items using an ontology for each category of the directory information, and arranging the correspondence between the plurality of domains and the plurality of evaluation items.

9. The method according to claim 7, wherein
said generating interprets one or more categories selected from among the categories included by the directory information as the specified domain, extracts an evaluation item belonging to the selected category, and generates an evaluation set including a correspondence between the extracted evaluation item and a category.

10. The method according to claim 9, wherein
said generating assigns a weight of an evaluation for each category to an evaluation item included by the evaluation set, and said computing computes the evaluation score using the assigned weight.

11. The method according to claim 9, further comprising:
obtaining an appropriate representative item name using an ontology depending on a category corresponding to an evaluation item for each category included by the evaluation set; and
presenting the representative item name as a modification candidate.

12. The method according to claim 1, wherein
said generating assigns a weight of an evaluation for each evaluation item to an evaluation item included by the evaluation set, and said computing computes the evaluation score using an assigned weight.

13. The method according to claim 1, wherein
said generating adds an evaluation item specified by a user to the evaluation set.

14. The method according to claim 1, wherein
said computing obtains a display order in the Web page to be evaluated of evaluation items included by the evaluation set, and computes the evaluation score.

15. The method according to claim 1, wherein
said presenting presents an evaluation result containing a specific evaluation item which lowers the evaluation score.

16. The method according to claim 1, further comprising:
predicting a change in evaluation score when a new evaluation item is added to the Web page to be evaluated; and
presenting a predicted result.

17. The method according to claim 1, further comprising:
checking whether the Web page to be evaluated includes an item other than evaluation items included by the evaluation set; and
presenting the item other than the evaluation items as special information.

18. The method according to claim 1, further comprising:
generating meta-information for generation of a new Web page in the specified domain using an evaluation item included by the evaluation set; and
presenting the meta-information.

19. A computer-readable storage medium storing a program, the program which when executed by a computer causes the computer to perform a process, the process comprising:
storing in advance, a correspondence between a plurality of domains, each of the plurality of domains including at least one category having a Web page group comprising Web pages for dissemination of information on the Internet, and a plurality of evaluation items related to the domains to objectively evaluate information disseminating items, and determining said correspondence between the plurality of domains and the plurality of evaluation items by extracting the information disseminating items set in advance from information in the Web page group, said information disseminating items including contents of dissemination information from the Web pages, based on evaluation criteria specific to information disseminating items of the Web pages;
extracting and arranging stored evaluation items corresponding to a specified domain from the plurality of evaluation items;
generating an evaluation set including the extracted, stored evaluation items for the specified domain;
extracting the information disseminating items from a Web page to be evaluated, corresponding to the extracted, stored evaluation items of the generated evaluation set;
computing an evaluation score of the Web page using the evaluation items included in the generated evaluation set and obtaining a hierarchical depth comprising a reciprocal of an appearance number from a top page of the Web page to be evaluated for each information disseminating item contained in the evaluation set; and
outputting an evaluation result including the computed evaluation score.

20. A computer readable medium comprising a web page evaluating method performed by a computer, the method comprising:
storing in advance, a correspondence between a plurality of domains, each of the plurality of domains including at least one category having a Web page group comprising Web pages for dissemination of information on the Internet, and a plurality of evaluation items related to the domains to objectively evaluate information disseminating items, and determining said correspondence between the plurality of domains and the plurality of evaluation items by extracting the information disseminating items set in advance from information in the Web page group, said information disseminating items including contents of dissemination information from the Web pages, based on evaluation criteria specific to information disseminating items of the Web pages;

extracting and arranging stored evaluation items corresponding to a specified domain from the plurality of evaluation items;

generating an evaluation set including the extracted, stored evaluation items for the specified domain;

extracting the information disseminating items from a Web page to be evaluated, corresponding to the extracted, stored evaluation items of the generated evaluation set;

computing an evaluation score of the Web page using the evaluation items included in the generated evaluation set and obtaining a hierarchical depth comprising a reciprocal of an appearance number from a top page of the Web page to be evaluated for each information disseminating item contained in the evaluation set; and outputting an evaluation result including the computed evaluation score.

21. A Web page evaluation apparatus comprising:

a storage device storing in advance, a correspondence between a plurality of domains, each of the plurality of domains including at least one category having a Web page group comprising Web pages for dissemination of information on the Internet, and a plurality of evaluation items related to the domains to objectively evaluate information disseminating items, and determining said correspondence between the plurality of domains and the plurality of evaluation items by extracting the information disseminating items set in advance from information in the Web page group, said information disseminating items including contents of the dissemination information from the Web pages, based on evaluation criteria specific to information disseminating items of the Web pages;

a generation device referring to the correspondence between the plurality of domains and the plurality of evaluation items, extracting stored evaluation items corresponding to a specified domain from the plurality of evaluation items, and generating an evaluation set including the extracted, stored evaluation items for the specified domain;

an evaluation device extracting the information disseminating items from a Web page to be evaluated, corresponding to the extracted, stored evaluation items of the generated evaluation set and computing an evaluation score of the Web page using the evaluation items included the generated evaluation set and obtaining a hierarchical depth comprising a reciprocal of an appearance number from a top page of the Web page to be evaluated for each information disseminating item contained in the evaluation set; and an output device outputting an evaluation result including the computed evaluation score.

22. A Web page evaluation apparatus comprising:

storage means for storing in advance, a correspondence between a plurality of domains, each of the plurality of domains including at least one category having a Web page group comprising Web pages for dissemination of information on the Internet, and a plurality of evaluation items related to the domains to objectively evaluate information disseminating items, and determining said correspondence between the plurality of domains and the plurality of evaluation items by extracting the information disseminating items set in advance from information in the Web page group, said information disseminating items including contents of dissemination information from the Web pages, based on evaluation criteria specific to information disseminating items of the Web pages;

generation means for referring to the correspondence between the plurality of domains and the plurality of evaluation items, extracting, stored evaluation items corresponding to a specified domain from the plurality of evaluation items, and generating an evaluation set including the extracted, stored evaluation items;

evaluation means for extracting the information disseminating items from a Web page to be evaluated, corresponding to the extracted, stored evaluation items of the generated evaluation set and computing an evaluation score of the Web page using the evaluation items included in the generated evaluation set and obtaining a hierarchical depth comprising a reciprocal of an appearance number from a top page of the Web page to be evaluated for each information disseminating item contained in the evaluation set; and output means for outputting an evaluation result including the computed evaluation score.

23. A method for evaluating dissemination information of a Web page, comprising:

storing a correspondence between a plurality of domains and a plurality of evaluation items, the evaluation items being determined based on the category of the corresponding domain;

generating an evaluation set based on the determined evaluation items for the specified domain;

extracting information disseminating items from a Web page to be evaluated corresponding to the generated evaluation set;

computing an evaluation score by obtaining a hierarchical depth comprising a reciprocal of an appearance number from a top page of the Web page for each information disseminating item contained in the evaluation set;

processing the evaluation score to produce a contents improvement result to suggest improvements to the contents of the Web page; and outputting the evaluation results including the computed evaluation score and contents improvement result.

* * * * *